United States Patent
Lim et al.

(10) Patent No.: US 10,904,570 B2
(45) Date of Patent: Jan. 26, 2021

(54) METHOD FOR ENCODING/DECODING SYNCHRONIZED MULTI-VIEW VIDEO BY USING SPATIAL LAYOUT INFORMATION AND APPARATUS OF THE SAME

(71) Applicant: KAONMEDIA CO., LTD., Seongnam-si (KR)

(72) Inventors: Jeong Yun Lim, Seoul (KR); Hoa Sub Lim, Seongnam-si (KR)

(73) Assignee: KAONMEDIA CO., LTD., Seongnam-si (KR)

( * ) Notice: Subject to any disclaimer, the term of this patent is extended or adjusted under 35 U.S.C. 154(b) by 0 days.

(21) Appl. No.: 16/331,819

(22) PCT Filed: Jul. 4, 2017

(86) PCT No.: PCT/KR2017/007064
§ 371 (c)(1),
(2) Date: Mar. 8, 2019

(87) PCT Pub. No.: WO2018/048078
PCT Pub. Date: Mar. 15, 2018

(65) Prior Publication Data
US 2019/0373287 A1     Dec. 5, 2019

(30) Foreign Application Priority Data

Sep. 8, 2016   (KR) .................. 10-2016-0115813
Sep. 8, 2016   (KR) .................. 10-2016-0115814
Sep. 8, 2016   (KR) .................. 10-2016-0115815

(51) Int. Cl.
*H04N 19/597*    (2014.01)
*H04N 19/105*    (2014.01)
(Continued)

(52) U.S. Cl.
CPC ......... *H04N 19/597* (2014.11); *H04N 19/105* (2014.11); *H04N 19/119* (2014.11); *H04N 19/176* (2014.11); *H04N 19/46* (2014.11)

(58) Field of Classification Search
CPC .. H04N 19/597; H04N 19/105; H04N 19/119; H04N 19/176; H04N 19/46
(Continued)

(56) References Cited

U.S. PATENT DOCUMENTS

2008/0219351 A1*   9/2008   Kim ............... H04N 19/597
                                               375/240.16
2009/0323822 A1* 12/2009   Rodriguez ..... H04N 21/4147
                                               375/240.25
(Continued)

FOREIGN PATENT DOCUMENTS

KR    10-2004-0050888 A    6/2004
KR    10-0789753 B1        1/2008
(Continued)

*Primary Examiner* — Hee-Yong Kim
(74) *Attorney, Agent, or Firm* — Novick, Kim & Lee, PLLC; Sang Ho Lee

(57) ABSTRACT

A video encoding method is provided, which includes steps of acquiring a synchronized multi-view video; generating a spatial layout information of the synchronized multi-view video; encoding the synchronized multi-view video; and signaling the spatial layout information corresponding to the encoded multi-view video.

17 Claims, 21 Drawing Sheets

(51) Int. Cl.
  *H04N 19/119*   (2014.01)
  *H04N 19/46*    (2014.01)
  *H04N 19/176*   (2014.01)

(58) Field of Classification Search
  USPC .................................................. 375/240.26
  See application file for complete search history.

(56) References Cited

U.S. PATENT DOCUMENTS

| | | |
|---|---|---|
| 2010/0157016 A1 | 6/2010 | Sylvain |
| 2012/0062756 A1 | 3/2012 | Tian et al. |
| 2013/0243103 A1* | 9/2013 | Sasaki ..................... H04N 13/00 375/240.25 |
| 2013/0258052 A1* | 10/2013 | Li ......................... H04N 13/161 348/43 |
| 2014/0185682 A1* | 7/2014 | Chen .................... H04N 19/597 375/240.16 |
| 2015/0195571 A1 | 7/2015 | Boyce et al. |
| 2016/0065980 A1* | 3/2016 | Choi ...................... H04N 19/70 375/240.25 |
| 2016/0112705 A1* | 4/2016 | Mukherjee ........... H04N 19/597 375/240.18 |

FOREIGN PATENT DOCUMENTS

| | | |
|---|---|---|
| KR | 10-2014-0058553 A | 5/2014 |
| WO | 2013-162258 A1 | 10/2013 |

\* cited by examiner

| nal_unit_type | Name of nal_unit_type | Content of NAL unit and RBSP syntax structure | NAL unit type class |
|---|---|---|---|
| 0<br>1 | TRAIL_N<br>TRAIL_R | Coded slice segment of a non-TSA, non-STSA trailing picture<br>Slice_segment_layer_rbsp( ) | VCL |
| 2<br>3 | TSA_N<br>TSA_R | Coded slice segment of a TSA picture<br>Slice_segment_layer_rbsp( ) | VCL |
| ... | ... | ... | ... |
| 20 | SRAP | Spatial random access of picture type | VCL |
| ... | ... | ... | ... |
| 33 | VPS_NUT | Video parameter set | non-VCL |
| ... | ... | ... | ... |
| 39 | FD_NUT | Filler data<br>Filler_data_rbsp( ) | non-VCL |
| ... | ... | ... | ... |
| XX...64 | UNSPEC XX ...<br>UNSPEC 64 | Unspecified | non-VCL |

FIG. 7

| video_parameter_set_rbsp( ) { | Descriptor |
|---|---|
| vps_video_parameter_set_id | u(4) |
| vps_base_layer_available_flag | u(1) |
| ... | ... |
| vps_other_type_coding_flag | u(1) |
| if(vps_other_type_coding_flag) | |
|   spatial_layout_information_parameters() | |
| ... | |

FIG. 8

| Seq_parameter_set_rbsp( ) { | Descriptor |
|---|---|
| sps_video_parameter_set_id | u(4) |
| Sps_max_sub_layers_minus1 | u(3) |
| Sps_temporal_id_nesting_flag | u(1) |
| ... | ... |
| Input_image_type_index | ue(v) |
| if(Input_image_type_index != -1) | |
| perspective_information_index | |
| ... | |
| } | |

FIG. 9

| spatial_layout_information( ) { | Descriptor |
|---|---|
| Input_Image_type_index | |
| Perspective_information | |
| Camera_parameter | |
| Scene_angle | |
| Scene_dynamic_range | |
| Independent_sub_image | |
| Scene_time_information | |
| ... | |
| } | |

FIG. 10

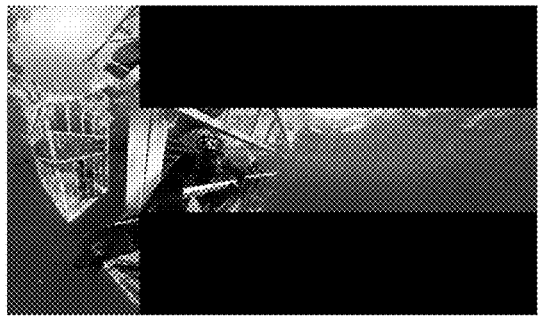
(a) Cubic layout 4x3

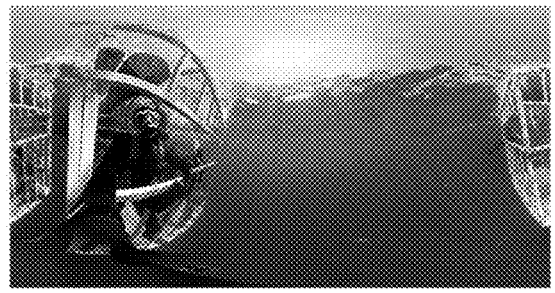
(c) Equirectangular

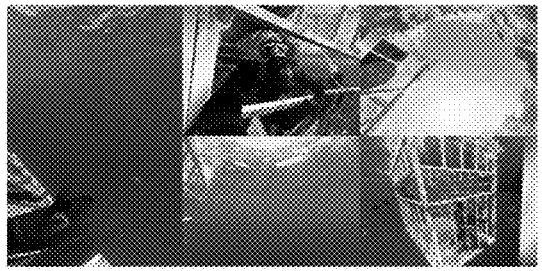
(b) Cubic layout 3x2

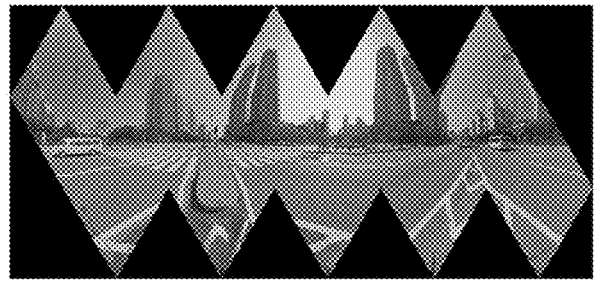
(d) Icosahedron

FIG. 11

| Index | Projection format Description |
|---|---|
| 0 | Equirectangular (ERP) |
| 1 | Cubemap (CMP) |
| 2 | Equal-area (EAP) |
| 3 | Octahedron (OHP) |
| 4 | Viewport generation using rectilinear projection |
| 5 | Icosahedron (ISP) |
| 6 | Crasters Parabolic Projection for CPP-PSNR calculation |
| 7 | Truncated Square Pyramid (TSP) |
| 8 | Segmented Sphere Projection (SSP) |
| 9 | Adjusted Cubemap Projection (ACP) |
| 10 | Rotated Sphere Projection (RSP) |

FIG. 12

Input image

Scanning order

FIG. 15

METHOD FOR ENCODING/DECODING SYNCHRONIZED MULTI-VIEW VIDEO BY USING SPATIAL LAYOUT INFORMATION AND APPARATUS OF THE SAME

TECHNICAL FIELD

The present invention relates to a method and an apparatus for encoding/decoding video, and more specifically, to a method and an apparatus for encoding/decoding synchronized multi-view video using spatial layout information.

BACKGROUND ART

Recently, studies on virtual reality (VR) technology for reproducing real world and giving vivid experience are being actively proceeded according to developments of digital video processing and computer graphics technology.

Especially, since recent VR system such as HMD (Head Mounted Display) can not only provide three-dimensional solid video to user's both eyes, but also perform tracking of view point omnidirectionally, it is watched with much interest that it can provide vivid virtual reality (VR) video contents which can be watched with 360 degrees rotation.

However, since 360 VR contents are configured with concurrent omnidirectional multi-view video information which is complexly synchronized with time and both eyes video spatially, in production and transmission of video, two synchronized large-sized videos should be compressed and delivered with respect to both eyes space of all the view points. This cause aggravation of complexity and bandwidth burden, and especially at a decoding apparatus, there comes a problem that decoding on regions off the track of user's view point and actually not watched is performed, by which unnecessary process is wasted.

Viewing the above, an encoding method is expected by which amount of transmission data and complexity of video are reduced, and efficiency in bandwidth and battery consumption of decoding apparatus can be realized.

DISCLOSURE

Technical Problem

The present invention is to settle the problem as mentioned above, and the objective thereof is to provide a method and an apparatus for encoding/decoding efficiently synchronized multi-view video of such as 360 degrees camera or video for VR, using spatial layout information of synchronized multi-view video.

Technical Solution

As a technical means for solving above-mentioned technical problem, a video encoding method according to an embodiment of the present invention includes steps of acquiring synchronized multi-view video; generating spatial layout information of the synchronized multi-view video; encoding the synchronized multi-view video; and signaling the spatial layout information, corresponding to the encoded multi-view video.

On the other hand, as a technical means for solving above-mentioned technical problem, a video encoding apparatus according to an embodiment of the present invention includes a video acquisition unit for acquiring synchronized multi-view video; a spatial layout information generation unit for generating spatial layout information of the synchronized multi-view video; a video encoding unit for encoding the synchronized multi-view video; and a spatial layout information signaling unit for signaling the spatial layout information, corresponding to the encoded multi-view video.

On the other hand, as a technical means for solving above-mentioned technical problem, a video decoding method according to an embodiment of the present invention includes steps of receiving bit stream; identifying whether the bit stream includes synchronized multi-view video or not; parsing spatial layout information in case that the synchronized multi-view video is included; and decoding the synchronized multi-view video, based on the spatial layout information.

As a technical means for solving above-mentioned technical problem, a video decoding method according to an embodiment of the present invention includes steps of receiving bit stream including encoded video; acquiring spatial layout information corresponding to synchronized multi-view video; and decoding selectively at least a portion of the bit stream, based on the spatial layout information.

And, as a technical means for solving above-mentioned technical problem, a video decoding apparatus according to an embodiment of the present invention includes a decoding processing unit for acquiring spatial layout information corresponding to synchronized multi-view video, from bit stream including encoded video, and decoding selectively at least a portion of the bit stream, based on the spatial layout information.

And, as a technical means for solving above-mentioned technical problem, a video encoding method according to an embodiment of the present invention includes steps of acquiring synchronized multi-view video; generating spatial layout information of the synchronized multi-view video; encoding the synchronized multi-view video; and transmitting bit stream including the encoded multi-view video and the spatial layout information to decoding system, and is characterized in that the decoding system decodes selectively at least a portion of the bit stream, based on the spatial layout information.

On the other hand, the video processing method may be realized as a medium readable by a computer on which program for running in a computer is written.

Advantageous Effects

According to an embodiment of the present invention, spatial layout information optimized for encoding and transmission is extracted and signaled from synchronized multi-view video, to reduce efficiently amount of transmission data, bandwidth and complexity of video.

And, at decoding end, in case that synchronized multi-view video is received, since partial decoding optimized to each view point and selective decoding can be performed according to the signaling information, system waste can be reduced, by which an encoding/decoding method and apparatus which is efficient in the aspect of complexity and battery consumption can be provided.

And, according to an embodiment of the present invention, by allowing support for spatial layout information on a variety of types of synchronized video, relevant video play according to decoding apparatus specification becomes available, by which apparatus compatibility can be improved.

DESCRIPTION OF DRAWINGS

FIG. 7 to FIG. 9 are tables for explanation of signaling method of spatial layout information according to a variety of embodiments of the present invention.

FIG. 10 is a table for explanation of structure of spatial layout information according to an embodiment of the present invention.

FIG. 11 and FIG. 12 are diagrams for explanation of type index table of spatial layout information according to an embodiment of the present invention.

FIG. 15 and FIG. 16 are diagrams for illustrating that scanning order at decoding end is determined according to signaling of spatial layout information according to an embodiment of the present invention.

DETAILED DESCRIPTION

Figure 1:
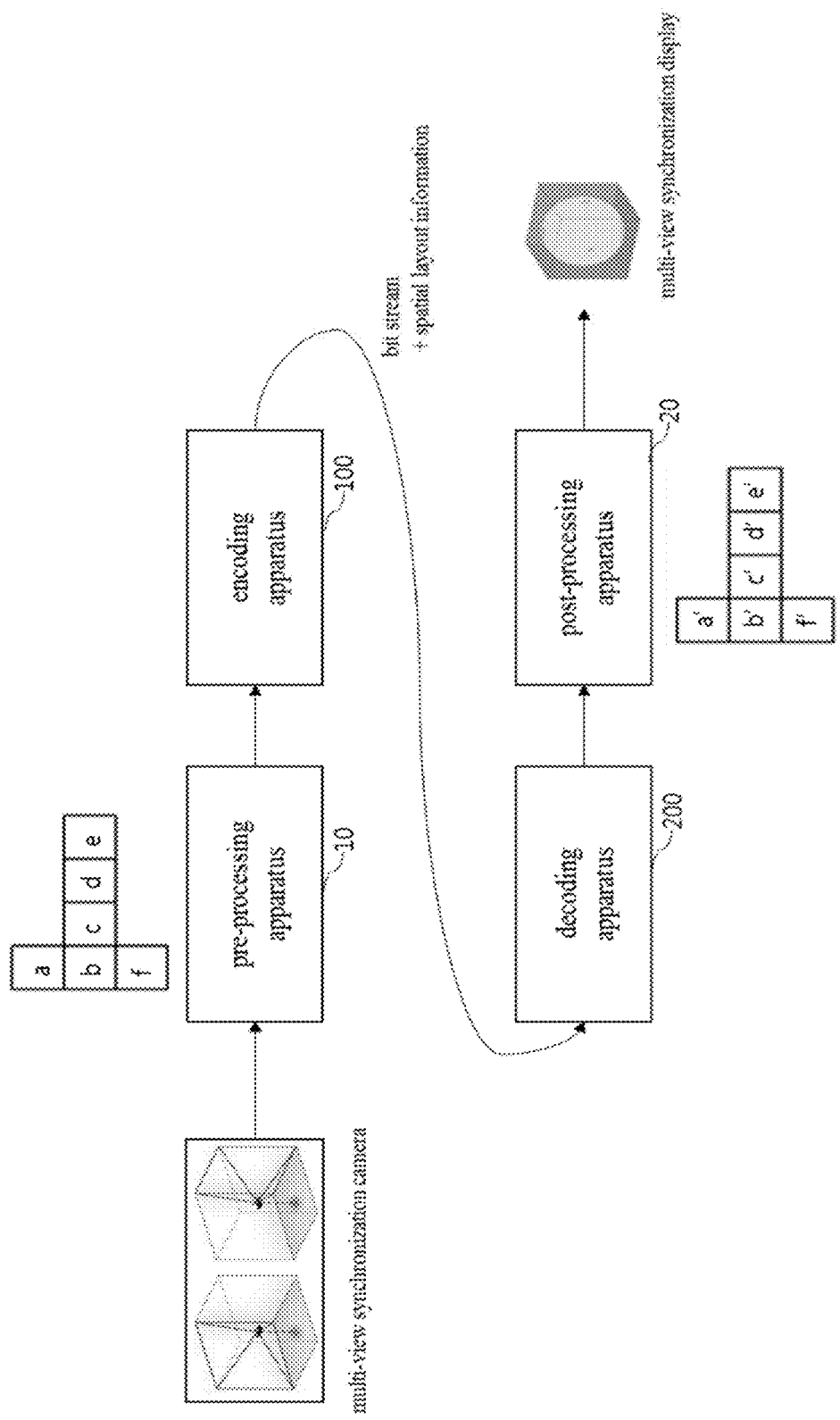
FIG. 1 shows an overall system structure according to an embodiment of the present invention.

Hereinafter, some embodiments of the present invention will be described in detail with reference to attached drawings, for a person having ordinary knowledge in the technical field in which the present invention pertains to implement it with ease. However, the present invention may be realized in a variety of different forms, and is not limited such embodiments depicted herein. And, for clarity of description of the present invention, some units in drawings which are not relevant to description may be omitted, and throughout the overall specification, like reference numerals designate like elements.

Throughout the specification of the present invention, when a unit is said to be "connected" to another unit, this includes not only a case where they are "directly connected", but also a case where they are "electrically connected" with other element sandwiched therebetween.

Throughout the specification of the present invention, when a member is said to be placed on another member, this includes not only a case where a member contacts another member, but also a case where more another member exists between two members.

Throughout the specification of the present invention, when a unit is said to "include" an element, this means not excluding other elements, but being able to include further elements. Words for degree such as "about", "practically", and so on used throughout the specification of the present invention are used for meaning of proximity from the value or to the value, when a production and material tolerance is provided proper to a stated meaning, and are used to prevent a disclosed content stated with exact or absolute value for facilitating understanding the present invention from being abused by an unconscionable infringer. Words of "step of ~ing" or "step of ~" used throughout the specification of the present invention do not mean "step for ~".

Throughout the specification of the present invention, wording of combination thereof included in Markush format means mixture or combination of one or more selected from a group consisting of elements written in expression of Markush format, and means including one or more selected from a group consisting of the elements.

In an element of the present invention, as an example of method for encoding synchronized video, encoding may be performed using HEVC (High Efficiency Video Coding) standardized commonly by MPEG (Moving Picture Experts Group) and VCEG (Video Coding Experts Group) having the highest encoding efficiency among video encoding standards developed until now or using an encoding technology which is currently under standardization, but not limited to such.

In general, an encoding apparatus includes encoding process and decoding process, while a decoding apparatus is furnished with decoding process. The decoding process of decoding apparatus is the same as that of encoding apparatus. Therefore, hereinafter, an encoding apparatus will be mainly described.

FIG. 1 shows the whole system structure according to an embodiment of the present invention.

Referring to FIG. 1, the whole system according to an embodiment of the present invention includes a pre-processing apparatus 10, an encoding apparatus 100, a decoding apparatus 200, and a post-processing apparatus 20.

A system according to an embodiment of the present invention may comprise the pre-processing apparatus 10 acquiring synchronized video frame, by pre-processing through work such as merge or stitch on a plurality of videos by view point, the encoding apparatus 100 encoding the synchronized video frame to output bit stream, the decoding apparatus 200 being transmitted with the bit stream and decoding the synchronized video frame, and the post-processing apparatus 20 post-processing the video frame for making synchronized video of each view point be output to each display.

Here, input video may include individual videos by multi-view, and for example, may include sub image information of a variety of view points photographed at a state in which one or more cameras are synchronized with time and space. Accordingly, the pre-processing apparatus 10 can acquire synchronized video information, by spatial merge or stitch processing acquired multi-view sub image information by time.

And, the encoding apparatus 100 may process scanning and prediction encoding of the synchronized video information to generate bit stream, and the generated bit stream may be transmitted to the decoding apparatus 200. Especially, the encoding apparatus 100 according to an embodiment of the present invention can extract spatial layout information from the synchronized video information, and can signal to the decoding apparatus 200.

Here, spatial layout information may include basic information on property and arrangement of each sub images, as one or more sub images are merged and configured into one video frame from the pre-processing apparatus 10. And, additional information on each of sub images and relationship between sub images may be further included, which will be described in detail later.

Accordingly, spatial layout information according to an embodiment of the present invention may be delivered to the decoding apparatus 200. And, the decoding apparatus 200 can determine decoding object and decoding order of bit stream, with reference to spatial layout information and user perspective information, which may lead to efficient decoding.

And, decoded video frame is divided again into sub images by each display through the post-processing apparatus 20, to be provided to a plurality of synchronized display system such as HMD, by which user can be provided with synchronized multi-view video with sense of reality such as virtual reality.

Figure 2:
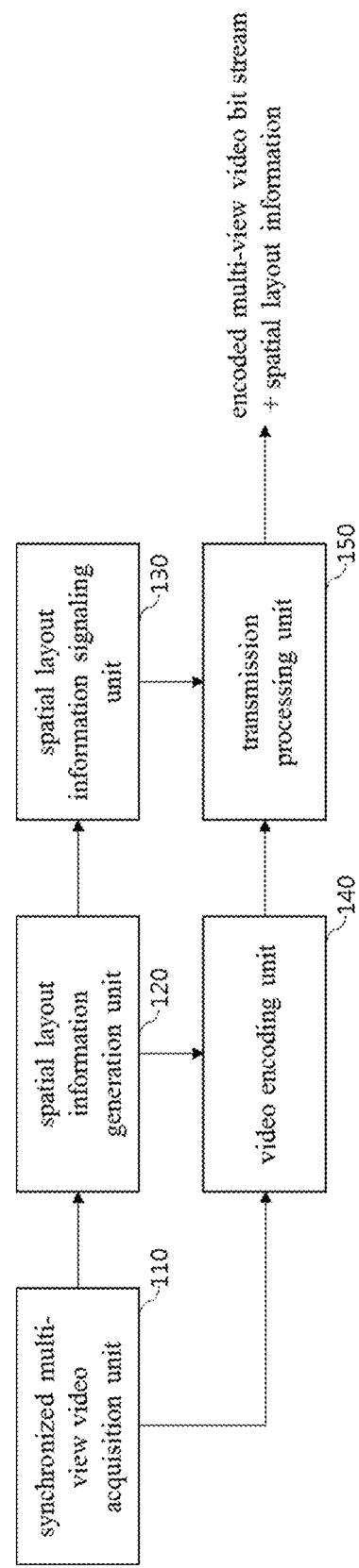
FIG. 2 is a block diagram showing structure of time synchronized multi-view video encoding apparatus according to an embodiment of the present invention.

FIG. 2 is a block diagram showing structure of time synchronized multi-view video encoding apparatus according to an embodiment of the present invention.

Referring to FIG. 2, the encoding apparatus 100 according to an embodiment of the present invention includes a synchronized multi-view video acquisition unit 110, a spatial layout information generation unit 120, a spatial layout information signaling unit 130, a video encoding unit, and a transmission processing unit 150.

The synchronized multi-view video acquisition unit 110 may acquire synchronized multi-view video, using synchronized multi-view video acquisition means such as 360 degrees camera. The synchronized multi-view video may include a plurality of sub images with time and space synchronization, and may be received from the pre-processing apparatus 10 or may be received from a separate foreign input apparatus.

And, the spatial layout information generation unit 120 may divide the synchronized multi-view video into video frames by time unit to extract spatial layout information with respect to the video frame. The spatial layout information may be determined according to state of property and arrangement of each sub image, or alternatively, may also be determined according to information acquired from the pre-processing apparatus 10.

And, the spatial layout information signaling unit 130 may perform information processing for signaling the spatial layout information to decoding apparatus 200. For example, the spatial layout information signaling unit 130 may perform one or more process, for having being included in encoded video data at video encoding unit, for configuring further data format, or for having being included in meta-data of encoded video.

And, the video encoding unit may perform encoding of synchronized multi-view video according to time flow. And, the video encoding unit may determine video scanning order, reference image, and the like, using spatial layout information generated at the spatial layout information generation unit 120 as reference information.

Therefore, the video encoding unit may perform encoding using HEVC (High Efficiency Video Coding) as described above, but can be improved in more efficient way as to synchronized multi-view video according to spatial layout information.

And, the transmission processing unit 150 may perform one or more conversion and transmission processing for combining encoded video data and spatial layout information inserted from the spatial layout information signaling unit 130 to transmit to decoding apparatus 200.

FIG. 3 to FIG. 6 are diagrams showing an example of spatial layout and video configuration of synchronized multi-view video according to an embodiment of the present invention.

Figure 3:
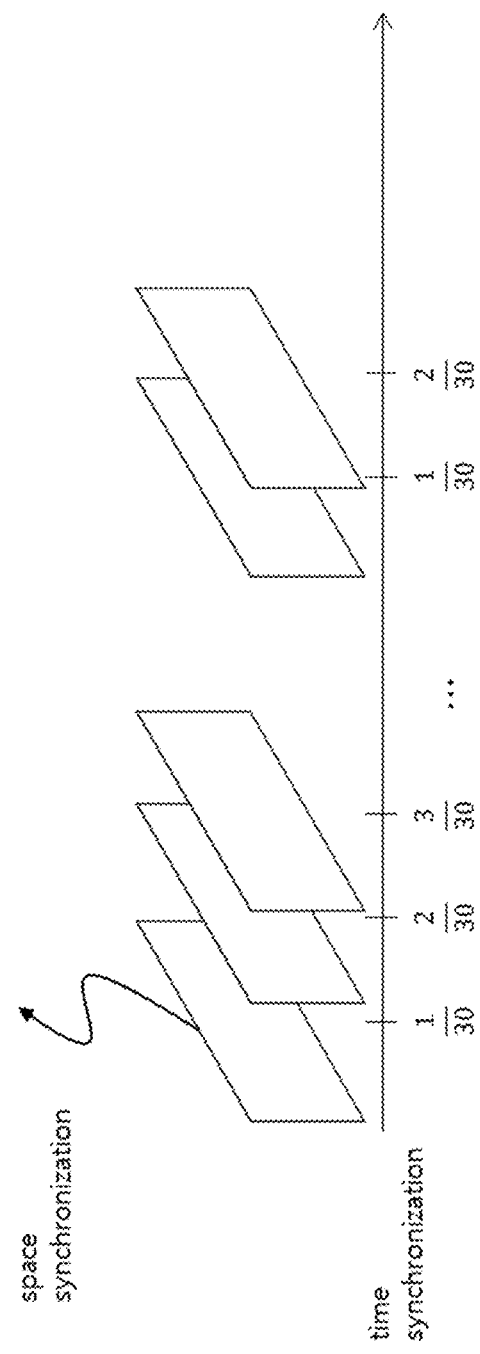
FIG. 3 to FIG. 6 are diagrams showing examples of spatial layouts of synchronized multi-view video according to embodiments of the present invention.

Referring to FIG. 3, multi-view video according to an embodiment of the present invention may include a plurality of video frames which are synchronized in time-base and space-base.

Each frame may be synchronized according to distinctive spatial layout, and may configure layout of sub images corresponding to one or more scene, perspective or view which will be displayed at the same time.

Accordingly, the spatial layout information may include sub images and related information thereof such as arrangement information of the multi-view video or sub images, position information and angle information of capture camera, merge information, information of the number of sub images, scanning order information, acquisition time information, camera parameter information, reference dependency information between sub images, in case that each of sub images configuring synchronized multi-view video is configured to one input video through merge, stitch, and the like, or in case that concurrent multi-view video (for example, a plurality of videos synchronized at the same time, which is corresponding to a variety of views corresponding in the same POC) is configured to input video.

Figure 4:
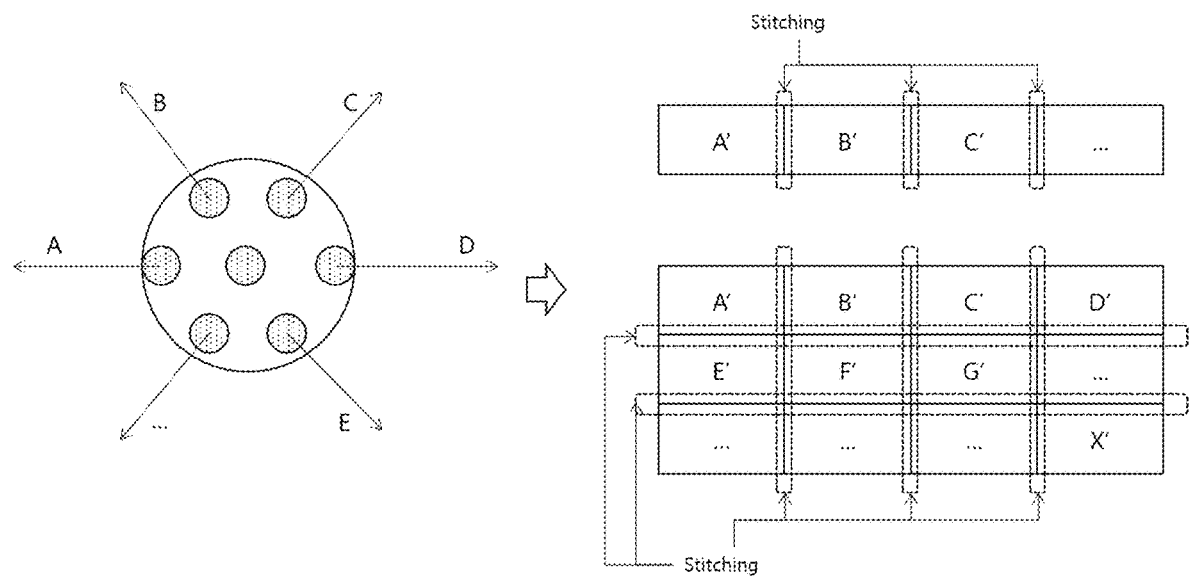

For example, as shown in FIG. 4, through camera arrangement of divergent form, video information may be photographed, and through stitch processing (stitching) on arranged video, space video observable over 360 degrees can be configured.

As shown in FIG. 4, videos A', B', C', . . . photographed corresponding to each camera arrangement A, B, C, . . . may be arranged according to one-dimensional or two-dimensional spatial layout, and left-right and top-bottom region relation information for stitch processing between arranged videos may be illustrated as a spatial layout information.

Accordingly, the spatial layout information generation unit 120 may extract spatial layout information including a variety of properties as described above from input video, and the spatial layout information signaling unit 130 may signal the spatial layout information by an optimized method which will be described later.

As described above, generated and signaled spatial layout information may be utilized as a useful reference information as described above.

For example, when content photographed through each camera is pre-stitched image, before encoding, each of the pre-stitched images may overlap to configure one scene. On the other hand, the scene may be separated by each view, and mutual compensation between images separated each by type may be realized.

Accordingly, in case of pre-stitched image in which one or more videos photographed at multi-view are merged and stitched into one image in pre-processing process to be delivered to input of encoder, scene information, spatial layout configuration information, and the like of merged and stitched input video may be delivered to encoding step and decoding step through separate spatial layout information signaling.

And, also in case of non-stitched image video type in which videos acquired at multi-view are delivered to one or more input videos with time-based synchronized view point to be encoded and decoded, they may be referred and compensated according to the spatial layout information at encoding and decoding steps. For the above, a variety of spatial layout information and data fields corresponding thereto may be necessary. And, data field may be encoded with compression information of input video, or may be transmitted with being included in separate meta-data.

And, data field including spatial layout information may be further utilized in the post-processing apparatus 20 of video and rendering process of display.

For the above, data field including spatial layout information may include position coordinate information and chrominance information acquired at the time of acquiring video from each camera.

Form example, information such as three-dimensional coordinate information and chrominance information (X, Y, Z), (R, G, B) of video acquired at the time of acquisition of video information from each camera may be acquired and delivered as additional information on each of sub images, and such information may be utilized at post-processing and rendering process of video, after performing decoding.

And, data field including spatial layout information may include camera information of each camera.

Figure 5:
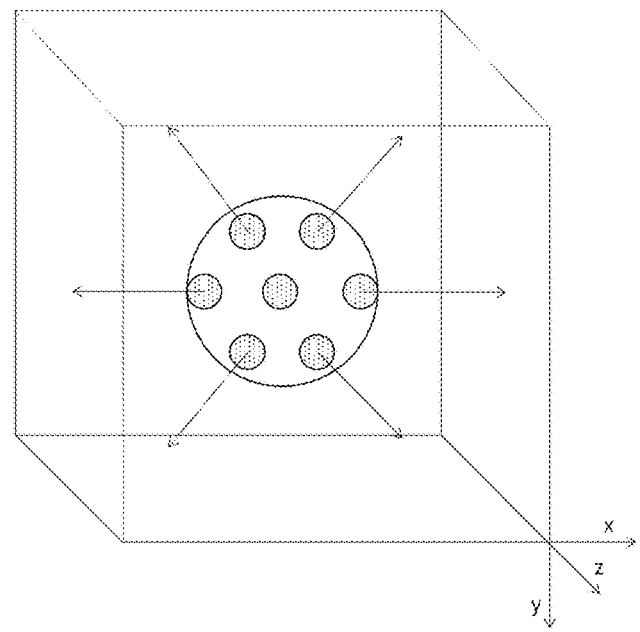
Figure 6:
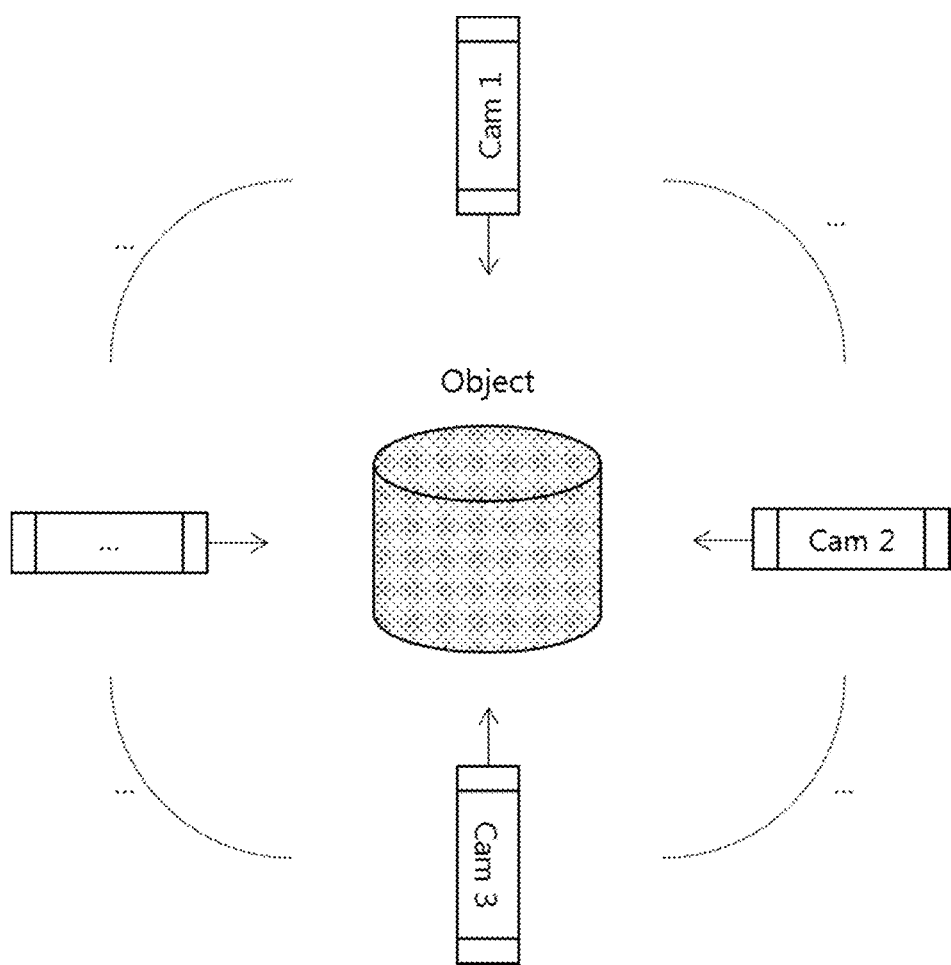

As shown in FIG. 5 and FIG. 6, one or more camera may be arranged photographing three-dimensional space to provide space video.

For example, as shown in FIG. 5, at the time of video acquisition, positions of one or more cameras may be fixed at center position and each direction may be set in the form of acquiring peripheral objects at one point in three-dimensional space.

And, as shown in FIG. 6, one or more cameras may be arranged in the form of photographing one object at a variety of angle. At this time, based on coordinate information (X, Y, Z), distance information, and the like at the time of video acquisition, user's motion information (Up/Down, Left/Right, Zoom in/Zoom Out) and the like is analysed at VR display device for playing three-dimensional video, and a portion of video corresponding to the above is decoded or post-processed, to be able to restored video of view point of portion wanted by user. On the other hand, as described above, in system such as compression, transmission, and play of synchronized multi-view video illustrated as VR video, separate video converting tool module and the like may be added, according to type or characteristics of video, characteristics of decoding apparatus and the like.

For example, when video acquired from camera is Equirectangular type, the video encoding unit 140 may convert it to video type of form of Icosahedron/cubemap and the like through converting tool module according to compression performance and encoding efficiency and the like of video to perform encoding thereby. Converting tool module at this time may be further utilized in pre-processing apparatus 10 and post-processing apparatus 20, and convert information according to conversion may be delivered to decoding apparatus 200, post-processing apparatus 20 or VR display apparatus in a form of meta-data with being included in the spatial layout information and the like.

On the other hand, to deliver synchronized multi-view video according to an embodiment of the present invention, separate VR video compression method to support scalability between encoding apparatus 100 and decoding apparatus 200 may be necessary.

Accordingly, the encoding apparatus 100 may implement compression encoding of video, in the way of dividing base class and improvement class, to compress VR video scalably.

By this way, in compressing high-resolution VR video in which one sheet of input video is acquired through a variety of cameras, in base class, compression on original video may be performed, while in improvement class, one sheet of picture may be divided in regions as slice/tile and the like, by which encoding by each sub image may be performed.

At this time, the encoding apparatus 100 may process compression encoding through prediction method between classes (Inter-layer prediction) by which encoding efficiency is enhanced utilizing restored video of base class as reference video.

On the other hand, at the decoding apparatus 200, when specific video should be rapidly decoded according to user's motion with decoding base class, by decoding partial region of improvement class, a partial video decoding according to user motion can be rapidly performed.

As described above, in scalabile compression way, the encoding apparatus 100 may encode base class, and in base class, scale down or down sampling or the like of voluntary rate on original video may be performed to compress. At this time, at improvement class, through scale up or up sampling or the like on restored video of base class, size of video is adjusted into the same resolution, and by utilizing restored video of base class corresponding to this as reference picture, encoding/decoding may be performed.

According to processing structure supporting scalability like above, the decoding apparatus 200 may decode entire bit stream of base class compressed at low bit or low resolution, and according to user's motion, can decode only a portion of video among the whole bit stream at improvement class. And, since decoding for entire video may not be performed as a whole, VR video may be able to be restored at only low complexity.

And, according to video compression way supporting separate scalability of different resolution, the encoding apparatus 100 may perform encoding based on prediction way between classes, in which, at base class, compression for original video or for video according to intention of video producer may be performed, while at improvement class, encoding is performed with reference to restored video of base class.

At this time, input video of improvement class may be a video encoded as a plurality of regions by dividing one sheet of input video through video division method. One divided region may include maximum one sub image, and a plurality of division regions may be configured with one sub image. Compressed bit stream encoded through division method like such can process two or more outputs at service and application step. For example, at service, the whole video is restored and output is performed through decoding for base class, and at improvement class, user's motion, perspective change and manipulation and the like are reflected through service or application, by which only a portion of region and a portion of sub image can be decoded.

FIG. 7 to FIG. 9 are tables for explanation of signaling method of spatial layout information according to a variety of embodiments of the present invention.

As shown in FIG. 7 to FIG. 9, in general video encoding, spatial layout information may be signaled as one class type of NAL (NETWORK ABSTRACTION LAYER) UNIT format on HLS such as SPS (SEQUENCE PARAMETER SET) or VPS (VIDEO PARAMETER SET) defined as encoding parameter.

Firstly, FIG. 7 shows NAL UNIT type in which synchronized video encoding flag according to an embodiment of the present invention is inserted, and for example, synchronized video encoding flag according to an embodiment of the present invention may be inserted to VPS (VIDEO PARAMETER SET) or the like.

Accordingly, FIG. 8 shows an embodiment in which spatial layout information flag according to an embodiment of the present invention is inserted into VPS (VIDEO PARAMETER SET).

As shown in FIG. 8, the spatial layout information signaling unit 130 according to an embodiment of the present invention may insert flag for kind verification of separate input video onto VPS. The encoding apparatus 100 may insert flag showing that synchronized multi-view video encoding like VR contents is performed and spatial layout information is signaled, using vps_other_type_coding_flag through the spatial layout information signaling unit 130.

And, as shown in FIG. 9, the spatial layout information signaling unit 130 according to an embodiment of the present invention can signal that it is multi-view synchronized video encoded video onto SPS (SEQUENCE PARAMETER SET).

For example, as shown in FIG. 9, the spatial layout information signaling unit 130 may insert type (INPUT_IMAGE_TYPE) of input video, by which index information of synchronized multi-view video can be transmitted with being included in SPS.

Here, in case that INPUT_IMAGE_TYPE_INDEX on SPS is not −1, in case that INDEX value is −1, or in case that value thereof is designated as 0 to be corresponding to −1 in meaning, it can be shown that INPUT_IMAGE_TYPE is synchronized multi-view video according to an embodiment of the present invention.

And, in case that type of input video is synchronized multi-view video, the spatial layout information signaling unit 130 may signal perspective information thereof with being included in SPS, by which a portion of spatial layout information of synchronized multi-view video may be transmitted with being inserted in SPS. The perspective information is an information in which image layout by time zone is signaled according to 3D rendering processing process of 2D video, wherein order information such as upper end, lower end, and aspect may be included.

Accordingly, the decoding apparatus 200 may decode the flag of VPS or SPS to identify whether the video performed encoding using spatial layout information according to an embodiment of the present invention or not. For example, in case of VPS of FIG. 5, VPS_OTHER_TYPE_CODING_FLAG is extracted to be verified whether the video is synchronization multi-view video encoded using spatial layout information.

And, in case of SPS in FIG. 9, by decoding PERSPECTIVE_INFORMATION_INDEX information, practical spatial layout information like layout can be identified.

At this time, spatial layout information may be configured as format of parameter, and for example, spatial layout parameter information may be included in different way each other on HLS such as SPS, and VPS, may be configured syntax thereof as form such as separate function, or may be defined as SEI message.

And, according to an embodiment, spatial layout information may be transmitted with being included in PPS (PICTURE PARAMETER SET). In this case, property information by each sub image may be included. For example, independency of sub image may be signaled. The independency may show that the video can be encoded and decoded without reference to other video, and sub images of synchronized multi-view video may include INDEPENDENT sub image and DEPENDENT sub image. The dependent sub image may be decoded with reference to independent sub image. The spatial layout information signaling unit 130 may signal independent sub image onto PPS in a form of list (Independent sub image list).

And, the spatial layout information may be signaled with being defined as SEI message. FIG. 10 illustrates SEI message as spatial layout information, and spatial layout information parameterized using spatial layout information descriptor may be inserted.

As shown in FIG. 10, spatial layout information may include at least one of type index information (input image type index), perspective information, camera parameter information, scene angle information, scene dynamic range information, independent sub image information, scene time information which can show spatial layout of input video, and additionally, a variety of information needed to efficiently encode multi-view synchronized video may be added. Parameters like such may be defined as SEI message format of one descriptor form, and, the decoding apparatus 200 may parse it to be able to use the spatial layout information efficiently at decoding, post-processing and rendering steps.

And, as described above, spatial layout information may be delivered to the decoding apparatus 200 in a format of SEI or meta-data.

And, for example, spatial layout information may be signaled by selection option like configuration at encoding step.

As a first option, spatial layout information may be included in VPS/SPS/PPS on HLS or coding unit syntax according to encoding efficiency on syntax.

As a second option, spatial layout information may be signaled at once as meta-data of SEI form on syntax.

Hereinafter, with reference to FIG. 11 to FIG. 19, efficient video encoding and decoding method according to synchronized multi-view video format according to an embodiment of the present invention may be described in detail.

As described above, a plurality of videos by view point generated at pre-processing step may be synthesized in one input video to be encoded. In this case, one input video may include a plurality of sub images. Each of sub images may be synchronized at the same point of time, and each may be corresponding to different view, visual perspective or scene. This may have effect of supporting a variety of view at the same POC (PICTURE ORDER COUNT) without using separate depth information like in prior art, and region overlapped between each sub images may be limited to boundary region.

Especially, spatial layout information of input video may be signaled in a form as described above, and the encoding apparatus 100 and decoding apparatus 200 can parse spatial layout information to use it in performing efficient encoding and decoding. That is, the encoding apparatus 100 may process multi-view video encoding using the spatial layout information at encoding step, while the decoding apparatus 200 may process decoding using the spatial layout information at decoding, pre-processing and rendering steps.

FIG. 11 and FIG. 12 are diagrams for explanation of type index table of spatial layout information according to an embodiment of the present invention.

As described above, sub images of input video may be arranged in a variety of ways. Accordingly, spatial layout information may include separately table index for signaling arrangement information. For example, as shown in FIG. 11, synchronized multi-view video may be illustrated with layout of Equirectangular (ERP), Cubemap (CMP), Equal-region (EAP), Octahedron (OHP), Viewport generation using rectilinear projection, Icosahedron (ISP), Crasters Parabolic Projection for CPP-PSNR calculation, Truncated Square Pyramid (TSP), Segmented Sphere Projection (SSP), Adjusted Cubemap Projection (ACP), Rotated Sphere Projection (RSP) and so on according to conversion method, and table index shown in FIG. 12 corresponding to each layout may be inserted.

More specifically, according to each spatial layout information, three-dimensional video of coordinate system corresponding to 360 degrees may be processed with projection to two-dimensional video.

ERP is to perform projection conversion of 360 degrees video to one face, and may include processing of u, v coordinate system position conversion corresponding to sampling position of two-dimensional image and coordinate conversion of longitude and latitude on sphere corresponding to the u, v coordinate system position. Accordingly, spatial layout information may include ERP index and single face information (for example, face index is set to 0).

CMP is to perform projection of 360 degrees video to six cubic faces, and may be arranged with sub images projected to each face index f corresponding to PX, PY, PZ, NX, NY, NZ (P denotes positive, and N, negative). For example, in case of CMP video, video in which ERP video is converted to 3×2 cubemap video may be included.

Accordingly, in spatial layout information, CMP index and each face index information corresponding to sub image may be included. The post-processing apparatus 20 may process two-dimensional position information on sub image according to face index, and may produce position information corresponding to three-dimensional coordinate system, and may output reverse conversion into three-dimensional 360 degrees video according to the above.

ACP is to apply function adjusted to fit to three-dimensional bending deformation corresponding to each of projection conversion to two-dimensional and reverse conversion to three-dimensional, in projecting 360 degrees video to six cubic faces as in CMP, wherein processing function thereof is different, though used spatial layout information may include ACP index and face index information by sub image. Therefore, post-processing apparatus 20 may process reverse conversion of two-dimensional position information on sub image according to face index through adjusted function to produce position information corresponding to three-dimensional coordinate system, and can output it as three-dimensional 360 degrees video according to above.

EAP is conversion projected to one face like ERP, and may include longitude and latitude coordinate convert processing on sphere immediately corresponding to sampling position of two-dimensional image. The spatial layout information may include EAP index and single face information.

OHP is to perform projection of 360 degrees video to eight octahedron faces using six vertices, and sub images projected using faces {F0, F1, F2, F3, F4, F5, F6, F7} and vertices (V0, V1, V2, V3, V3, V4, V5) may be arranged in converted video.

Accordingly, at spatial layout information, OHP index, each face index information corresponding to sub image, and one or more vertex index information matched to the face index information may be included. And, sub image arrangement of converted video may be divided into compact case and not compact case. Accordingly, spatial layout information may further include compact-or-not identification information. For example, face index and vertex index matching information and reverse conversion process may be determined differently for case of not compact and case of compact. For example, at face index 4, vertex index V0, V5, V1 may be matched in case of not being compact, while another matching of V1, V0, V5 may be processed in case of being compact.

The post-processing apparatus 20 may process reverse conversion of two-dimensional position information on sub image according to face index and vertex index to produce vector information corresponding to three-dimensional coordinate system, by which reverse conversion to three-dimensional 360 degrees video can be output according to above.

ISP is to project 360 degrees video using 20 faces and 12 vertices, wherein sub images according to each conversion may be arranged in converted video. The spatial layout information may include at least one of ISP index, face index, vertex index, and compact identification information similarly to OHP.

SSP is to process with dividing sphere body of 360 degrees video into three segments of the north pole, the equator and the south pole, wherein the north pole and the south pole may be mapped to two circles identified by index respectively, edge between two polar segments may be processed with gray inactive sample, and the same projection method as that of ERP may be used to the equator. Accordingly, spatial layout information may include SSP index and face index corresponding to each the equator, the north pole and the south pole segment.

RSP may include way in which sphere body of 360 degrees video is divided into two same-sized divisions, and then the divided videos are expanded in two-dimensional converted video, to be arranged at two rows. And, RSP can realize the arrangement using six faces as 3×2 aspect ratio similar to CMP. Accordingly, a first division video of upper end segment and a second division video of lower end segment may be included in converted video. At least one of RSP index, division video index and face index may be included in the spatial layout information.

TSP may include a method of deformation projection of frame in which 360 degrees video is projected to six cubic faces corresponding to face of Truncated Square Pyramid. Accordingly, size and form of sub image corresponding to each face may be all different. At least one of TSP identification information and face index may be included in spatial layout information.

Viewport generation using rectilinear projection is to convert 360 degrees video and acquire two-dimensional video projected by setting viewing angle as Z axis, and spatial layout information may further include viewport generation using rectilinear projection index information and viewport information showing view point. On the other hand, spatial layout information may further include interpolation filter information to be applied in the video conversion. For example, interpolation filter information may be different according to each projection conversion way, and at least one of nearest neighbor filter, Bi-Linear filter, Bi-Cubic filter, and Lanczos filter may be included.

On the other hand, conversion way and index thereof for evaluation of processing performance of pre-processing conversion and post-processing reverse conversion may be defined separately. For example, performance evaluation may be used to determine pre-processing method at pre-processing apparatus 10, and as a method therefor, CP method converting two different converted videos to CPP (Crasters Parablic Projection) domain to measure PSNR may be illustrated.

It should be noted that, table shown in FIG. 12 is arranged randomly according to input video, which can be changed according to encoding efficiency and contents distribution of market and the like.

Accordingly, the decoding apparatus 200 may parse table index signaled separately to use it in decoding processing.

Especially, in an embodiment of the present invention, each layout information can be used helpfully in partial decoding of video. That is, sub image arrangement information such as cubic layout may be used in dividing independent sub image and dependent sub image, and accordingly, can be also used in determining efficient encoding and decoding scanning order, or in performing partial decoding on specific view point.

Figure 13:
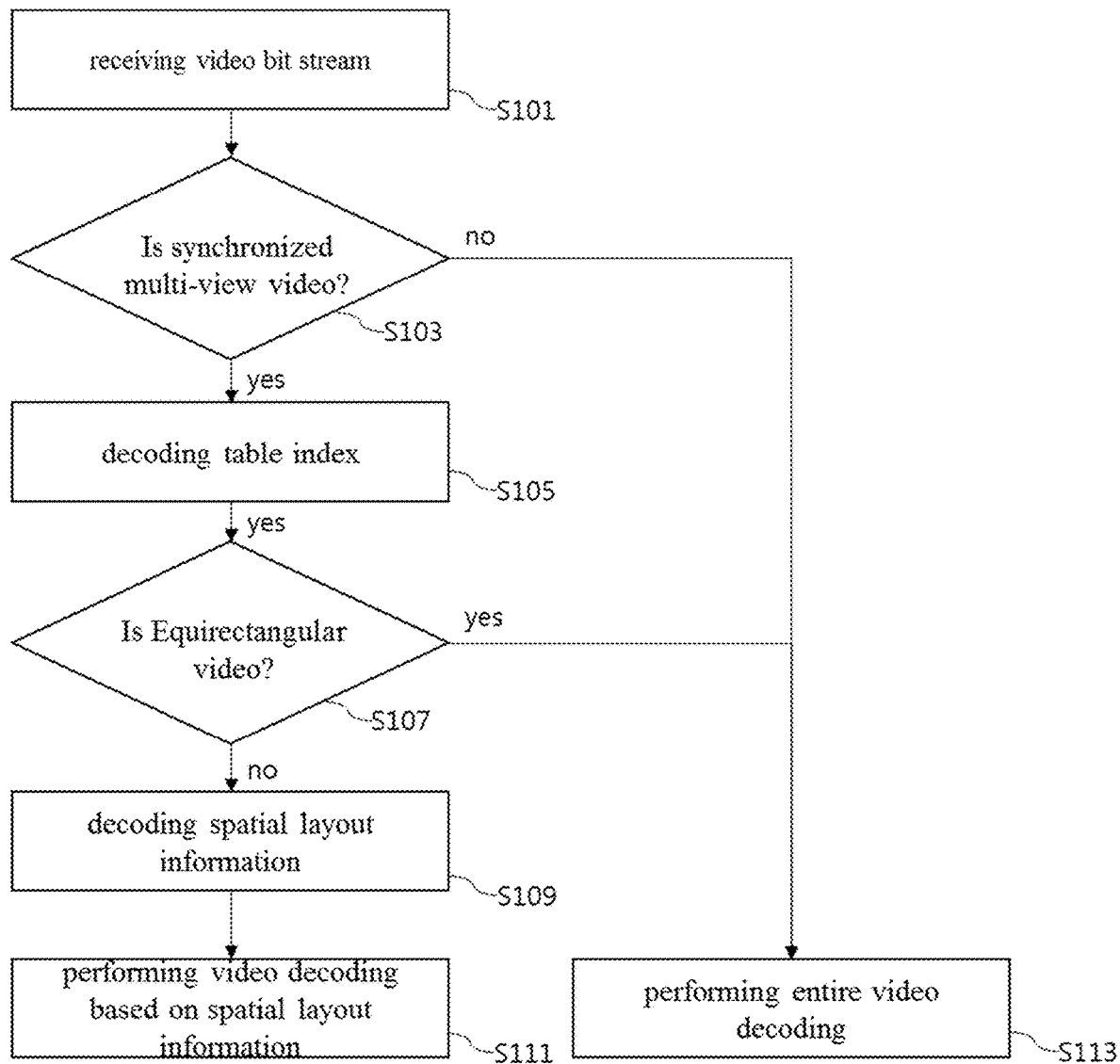
FIG. 13 is a diagram for explanation of perspective information table of spatial layout information according to an embodiment of the present invention.

FIG. 13 is a flow chart for explanation of decoding method according to an embodiment of the present invention.

Referring to FIG. 13, first, the decoding apparatus 200 receives video bit stream (S101).

And, the decoding apparatus 200 verifies whether video is synchronized multi-view video or not (S103).

Here, decoding apparatus 200 can identify whether it is synchronized multi-view video from flag signaled from the spatial layout information signaling unit 130 from video bit stream. For example, the decoding apparatus 200 can identify whether video is synchronized multi-view video from VPS, SPS, and the like as described above.

In case of not being synchronized multi-view video, general overall video decoding is performed (S113).

And, in case of being synchronized multi-view video, the decoding apparatus 200 decodes table index from spatial layout information (S105).

Here, the decoding apparatus 200 can identify whether equirectangular video or not from table index (S107).

This is because, in case of equirectangular video from synchronized multi-view video, it may not be divided in separate sub image, and the decoding apparatus 200 perform decoding of the whole video for equirectangular video (S113).

In case of not being equirectangular video, the decoding apparatus 200 decodes rest of the whole spatial layout information (S109), and performs video decoding processing based on the spatial layout information (S111).

Figure 14:
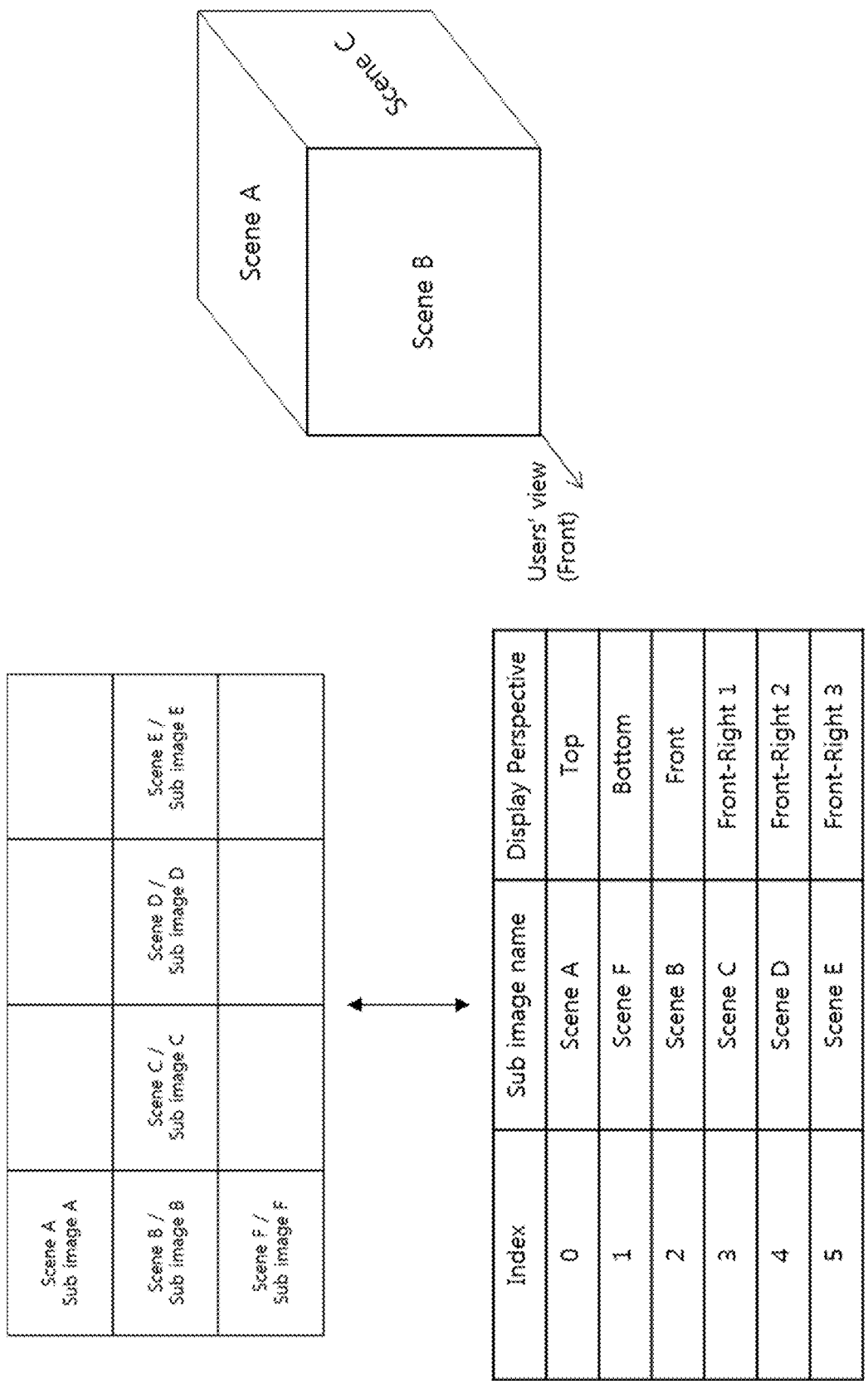
FIG. 14 is a flow chart for explanation of decoding method according to an embodiment of the present invention.

FIG. 14 is a diagram for explanation of perspective information table of spatial layout information according to an embodiment of the present invention.

The spatial layout information according to an embodiment of the present invention may include table for perspective information.

The encoding apparatus 100 and decoding apparatus 200 may use the perspective information table as information for referring between videos, encoding, decoding order, and dividing independent sub image.

And, at the time of rendering at multi-view display apparatus, perspective information table may be delivered to system layer of apparatus with decoded video, and using the information, user can watch video with matching phase according to intention of contents provider.

More specifically, the spatial layout information signaling unit 130 can signal perspective of each sub image. Especially, spatial layout information signaling unit 130 may signal only information on top, bottom and front video according to type of video, and information of video about rest aspects can be made to be derived by the decoding apparatus 200 using top scene, front perspective scene, and bottom scene information. Therefore, only minimum information can be signaled.

Figure 15:
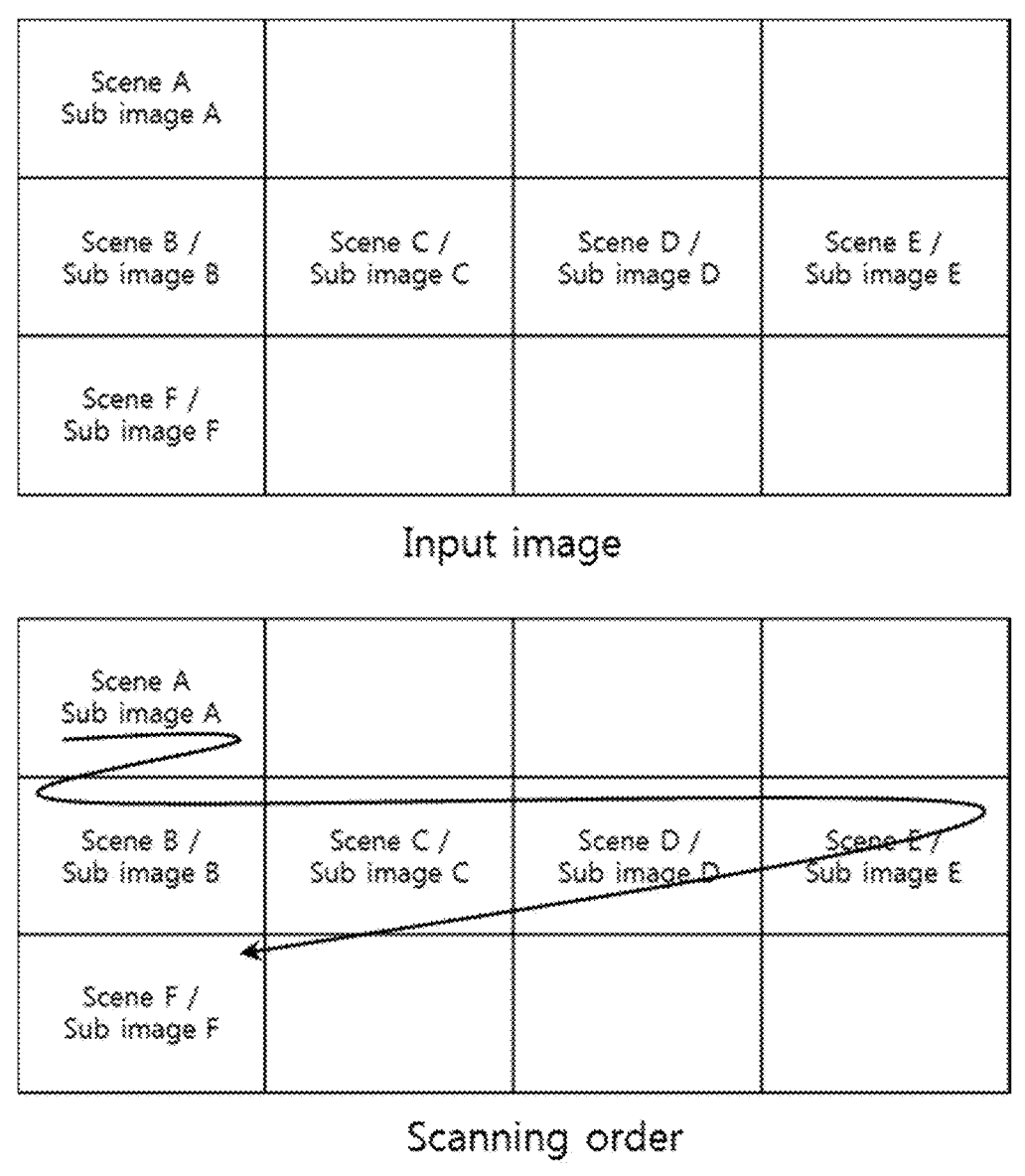
Figure 16:
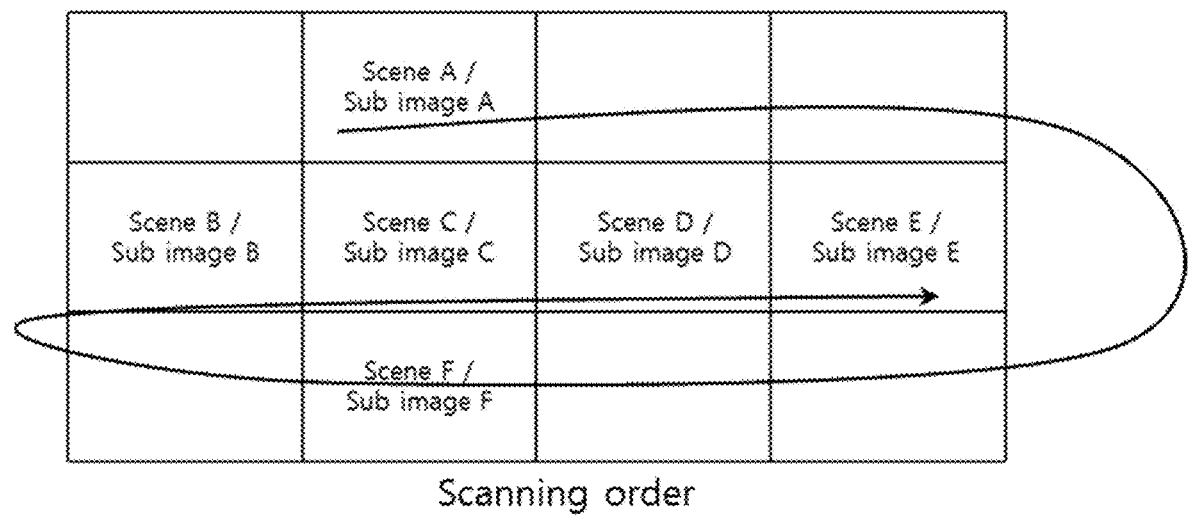

FIG. 15 and FIG. 16 are diagrams illustrating that scanning order is determined at decoding end according to signaling spatial layout information according to an embodiment of the present invention.

As shown in FIG. 15 and FIG. 16, according to type index of spatial layout information, scanning order of sub images may be transmitted together, and through transmitted scanning order information, efficient decoding and rendering can be performed.

FIG. 15 and FIG. 16 shows that scanning of original video is performed in A→B→C→D→E→F order.

For signaling for above, the spatial layout information signaling unit 130 may signal only order information for partial sub image such as top view, bottom view, and front view from scanning order. The decoding apparatus 200 can derive the whole order using order information of the partial sub image.

And, according to kind, parallelism and referring structure of transmitted video, scanning order may be changed as in FIG. 15 or FIG. 16.

When top to be A, bottom F, and front B, scanning order of FIG. 15 may be A→F→B→C→→D→E, while that of FIG. 16, A→B→C→D→E→F. This may be used helpfully in case of determining scanning order differently considering encoding efficiency.

Figure 17:
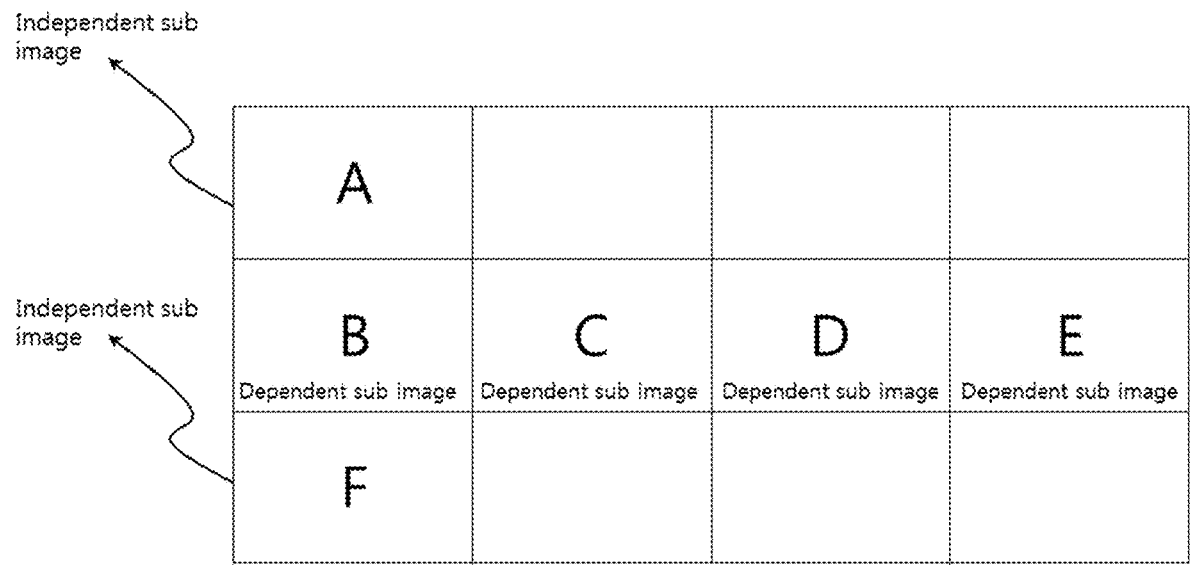
FIG. 17 is a diagram for explanation of independent sub image and dependent sub image divided according to signaling of spatial layout information.

FIG. 17 is a diagram for explanation of independent sub image and dependent sub image divided according to signaling spatial layout information.

As shown in FIG. 17, each of sub images arranged at spatial layout may be divided into dependent sub image and independent sub image considering dependency and parallelism. The independent sub image has characteristics of being decoded without reference to other sub image, while the dependent sub image can be restored with reference to neighboring independent sub image or neighboring dependent sub image.

Therefore, independent sub image may have characteristics that it should be encoded or decoded in advance to dependent sub image.

In an embodiment, independent sub image may be encoded or decoded with reference to independent sub image already encoded or decoded of not the same in time axis, while dependent sub image may be encoded or decoded with reference to independent sub image of the same or not the same in time axis. And, whether being independent or not may be signaled as separate index according to spatial layout information.

Figure 18:
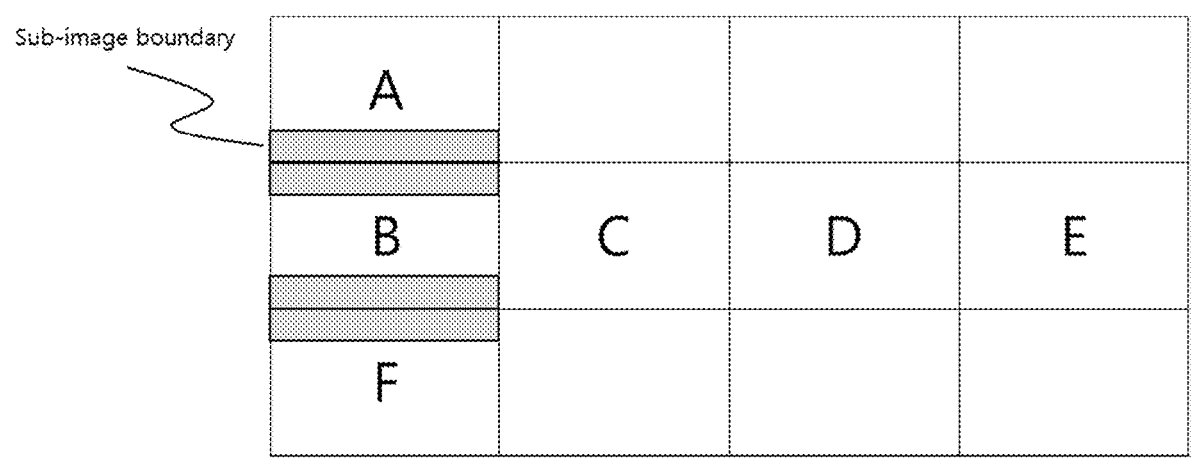
FIG. 18 and FIG. 19 show that boundary region between sub images is decoded by reference to independent sub image, according to spatial layout information.
Figure 19:
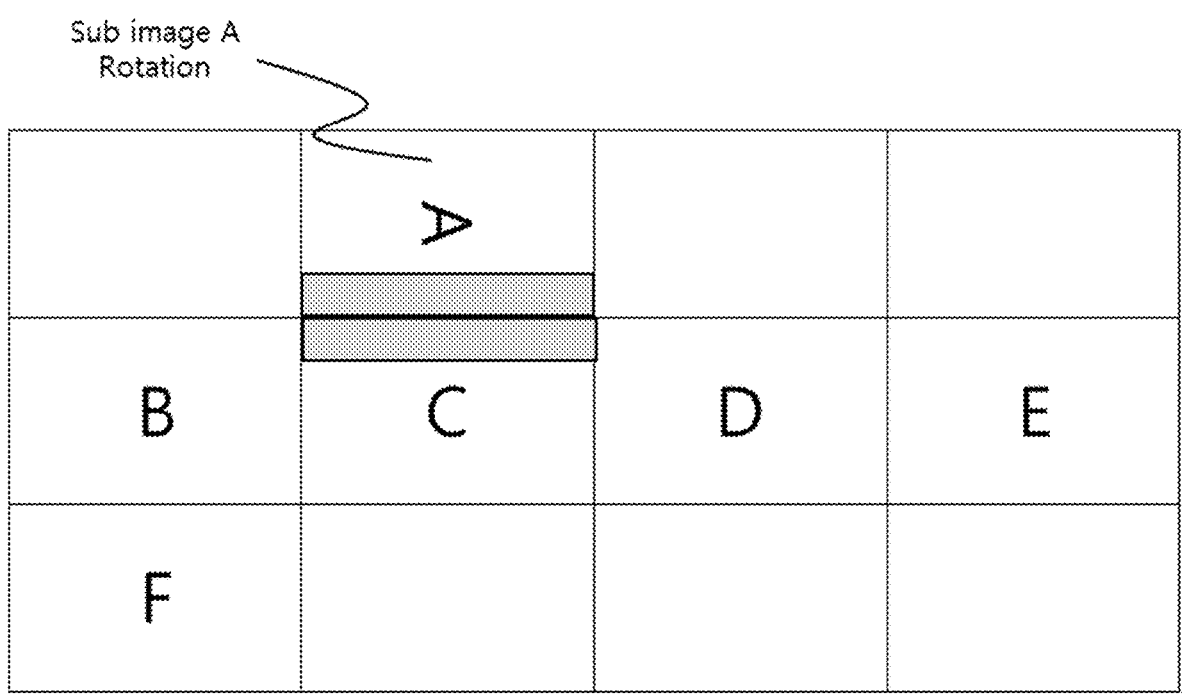

FIG. 18 and FIG. 19 shows that boundary region between sub images are decoded with reference to independent sub image according to spatial layout information.

As described above, the encoding apparatus 100 or decoding apparatus 200 can process encoding and decoding simultaneously considering scanning order and dependency information of sub image.

As shown in FIG. 18, when A and F are independent sub images, scanning order may be transmitted and derived like A→F→B→C→D→E, and in this case, decoding for A and F should be performed prior to other dependent sub images. And, when rest of B, C, D, and E are decoded, neighboring boundary region of each sub image may be decoded with reference to independent sub image. Accordingly, boundary region of independent sub image already decoded or dependent sub image already decoded can be referred at decoding of rest sub images.

And, above-said independent sub image may be used, not only in one video frame, but also in performing intra/inter encoding and decoding at boundary region of neighboring picture.

However, as shown in FIG. 19, there may be a case that 1:1 mapping is not realized because of different resolutions (In case of general video, ratio of width is wider than that of height).

In this case, to refer to the near face, through video processing method such as rotation and up sampling for object sub image, scale according to resolution is adjusted, to be able to be referred in encoding or decoding of boundary region.

And, the video processing method may include filter processing such as interpolation filter, deblocking filter, SAO (Sample Adaptive Offset) and ALF (Adaptive Loop Filter), and in case that filter processing is necessary for boundary region between the sub images, the filter processing may be applied selectively.

For example, in encoding/decoding of upper end region boundary of C in FIG. 19, side value of A may be referred to. For this, the encoding apparatus 100 or decoding apparatus 200 may perform up sampling of side value (height) of A to ratio corresponding to width of C, and may generate reference block value according to the position, by which encoding and decoding can be performed. FIG. 20 to FIG. 24 are diagrams showing decoding system and operation thereof according to an embodiment of the present invention.

Figure 20:
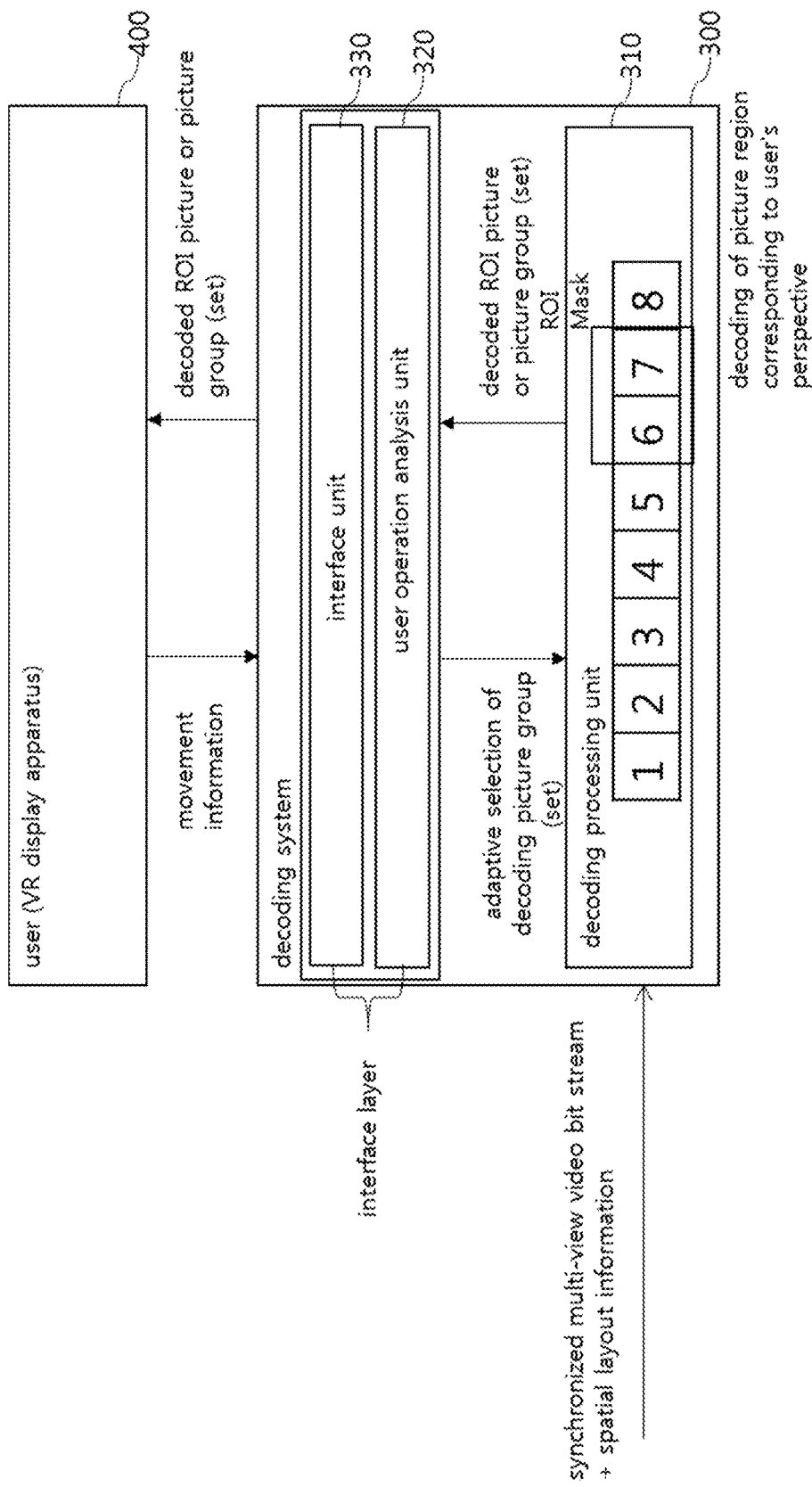
FIG. 20 to FIG. 24 are diagrams showing decoding system and operation thereof according to an embodiment of the present invention.

Referring to FIG. 20, a decoding system 300 according to an embodiment of the present invention may configure client system receiving the whole synchronized multi-view video bit stream and spatial layout information from encoding apparatus 100 described above, external server or the like and providing one or more decoded picture to user's virtual reality display apparatus 400.

For this, decoding system 300 may include decoding processing unit 310, user operation analysing unit 320 and interface unit 330. Though the decoding system 300 is described as separate system in this specification, this can be configured by combination of the whole or a portion of module configuring above-said decoding apparatus 200 and post-processing apparatus 20 for performing needed decoding processing and post-processing, or can be configured by extending the decoding apparatus 200. Therefore, it is not limited by designation thereof.

Accordingly, the decoding system 300 according to an embodiment of the present invention may perform selective decoding for a portion from the whole bit stream, based on spatial layout information received from the encoding apparatus 100 and user perspective information according to user operation analysis. Especially, according to selective decoding described in FIG. 20, the decoding system 300 may make correspondence of input videos having a plurality of view points of the same time (POC, Picture of Count) to user's view point by a direction, using spatial layout information. And, partial decoding for pictures of interested region (ROI, Region Of Interest) determined by user perspective by above may be performed.

As described above, the decoding system 300 can process selectively decoding corresponding to specific region selected using spatial layout information. For example, by decoding processed individually according to structure information, quality parameter (Qp) value corresponding to specific selected region is determined, and selective decoding according this can be processed. Especially, in selective decoding for the interested region (ROI), value of the quality parameter may be determined differently from that of other region. According to user's perspective, quality parameter for detailed region which is a portion of the ROI region may be determined differently from that of other region.

For the above, interface layer for receiving and analysing user information may be included at the decoding system 300, and mapping of view point supported by video currently being decoded and view point of the VR display apparatus 400, post-processing, rendering and the like may be selectively performed. More specifically, interface layer may include one or more processing modules for post-processing and rendering, the interface unit 330 and the user operation analysing unit 320.

The interface unit 330 may receive motion information from the VR display apparatus 400 worn by user.

The interface unit 330 may include one or more data communication module for receiving through wire or wirelessly signal of at least one of, for example, environment sensor, proximity sensor, operation sensing sensor, position sensor, gyroscope sensor, acceleration sensor, and geomagnetic sensor of user's VR display apparatus 400.

And, the user operation analysing unit 320 may analyse user operation information received from the interface unit 330 to determine user's perspective, and may deliver selection information for selecting adaptively decoding picture group corresponding to above to the decoding processing unit 310.

Accordingly, the decoding processing unit 310 may set ROI mask for selecting ROI (Region Of Interest) picture based on selection information delivered from the user operation analysing unit 320, and can decode only picture region corresponding to set ROI mask. For example, picture group may be corresponding to at least one of a plurality of sub images in above-said video frame, or reference images.

For example, as shown in FIG. 20, in case that sub images of specific POC decoded at the decoding processing unit 310 exist from 1 to 8, the decoding processing unit 310 may process decoding of only 6 and 7 of sub image region corresponding to user's visual perspective, which can improve processing speed and efficiency at real time.

Figure 21:
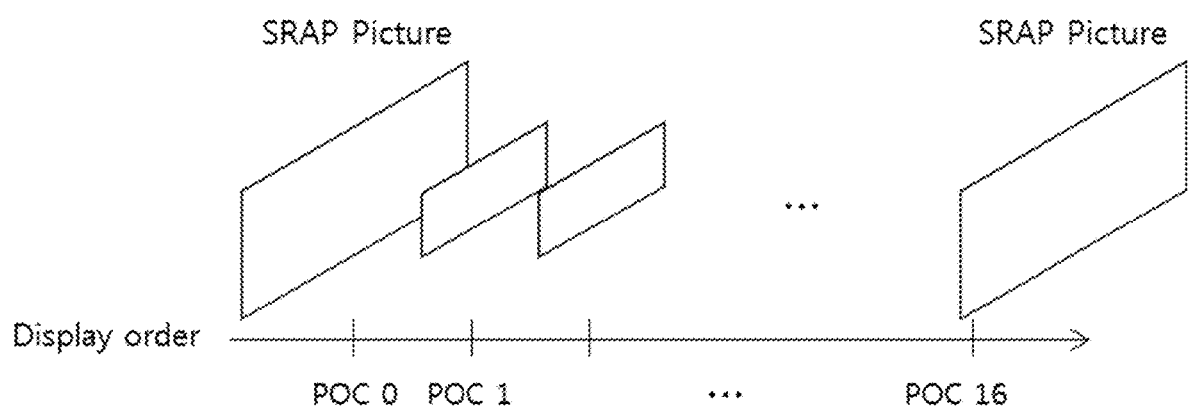
Figure 22:
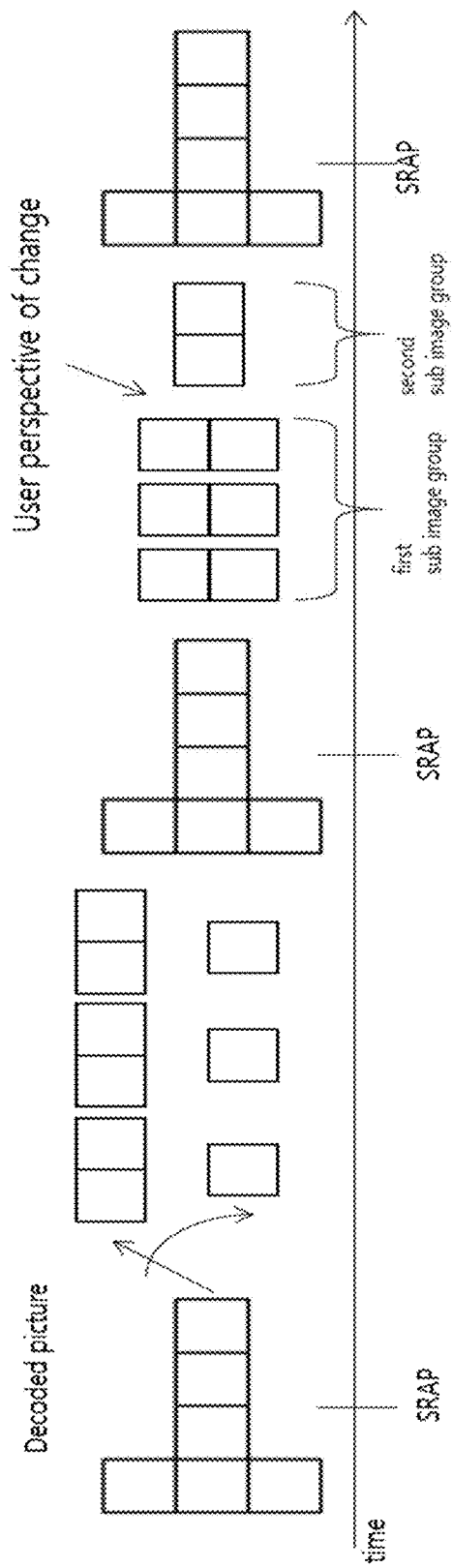

FIG. 21 illustrates entire encoded bit stream and GOP (GROUP OF PICTURES) according to an embodiment of the present invention, and FIG. 22 shows that decoded picture group is changed selectively from the whole bit stream according to user perspective.

As described above, the decoding system 300 according to an embodiment of the present invention may receive entire encoded bit stream of received synchronized multi-view video, to perform decoding for sub bit stream corresponding to user's visual view (perspective view).

At this time, spatial layout information of synchronized multi-view video may be signaled in form of SEI, HLS or the like as described above. Especially, according to an embodiment, the decoding system 300 may generate and build reference structure using independent sub image, dependent sub image and SRAP (spatial random access picture) identified from the signaling information. And, a portion of bit stream may be selected and decoded according to visual perspective change using the reference structure.

For this, the encoding apparatus 100 can select picture as spatial random access picture (SRAP) by NAL type or PPS, and SRAP picture may be used as reference picture in intra prediction encoding of sub images of other picture not selected.

Therefore, the encoding apparatus 100 and decoding apparatus 200 may process encoding and decoding with selecting one or more of the SRAP picture for picture not selected as SPAP by specific GOP (Group Of Picture), NAL type or PPS.

More specifically, SRAP picture may mean a picture capable of decoding independently one sheet of input video configured as multi-view on the same time for decoding on a portion of bit stream of the whole bit stream without relation to decoding of videos on different time each other using data redundancy and the like between sub images in SRAP picture.

And, in picture selected as SRAP, each sub images may be performed encoding/decoding through prediction in screen (Intra coding) and the like, and at least one or more SRAP picture in a certain GOP may be included for decoding a portion of bit stream of the whole bit stream.

And, pictures not selected as SRAP picture may be used to perform decoding according to user perspective, through prediction method between screens and the like, utilizing pictures selected as SRAP picture as reference picture.

Accordingly, the decoding system 300 may be able to decode one or more sub image selected corresponding to user's visual perspective through the decoding processing unit 310 using the reference picture.

On the other hand, picture selected as the SRAP may be entire intra prediction encoded of single video according to general encoding and decoding method without reference.

Therefore, the decoding system 300 or decoding apparatus 200 needs to store at least one or more SRAP pictures at DPB (DECODED PICTURE BUFFER). And, picture already decoded at one GOP or sub image between SRAP pictures may be decoded using picture stored as the SRAP as reference picture.

Accordingly, FIG. 22 shows picture designated as SRAP and change of selective decoding region according to user perspective change. As shown in FIG. 19, cycle by which SRAP picture is decoded may be predetermined specific time cycle.

And, sub image group decoded may be changed according to occurrence time of change of user perspective by referring decoded SRAP picture periodically. For example, as in FIG. 19, at the time of occurrence of user perspective change, decoding ROI region may be changed from first sub image group to second image sub image group.

Figure 23:
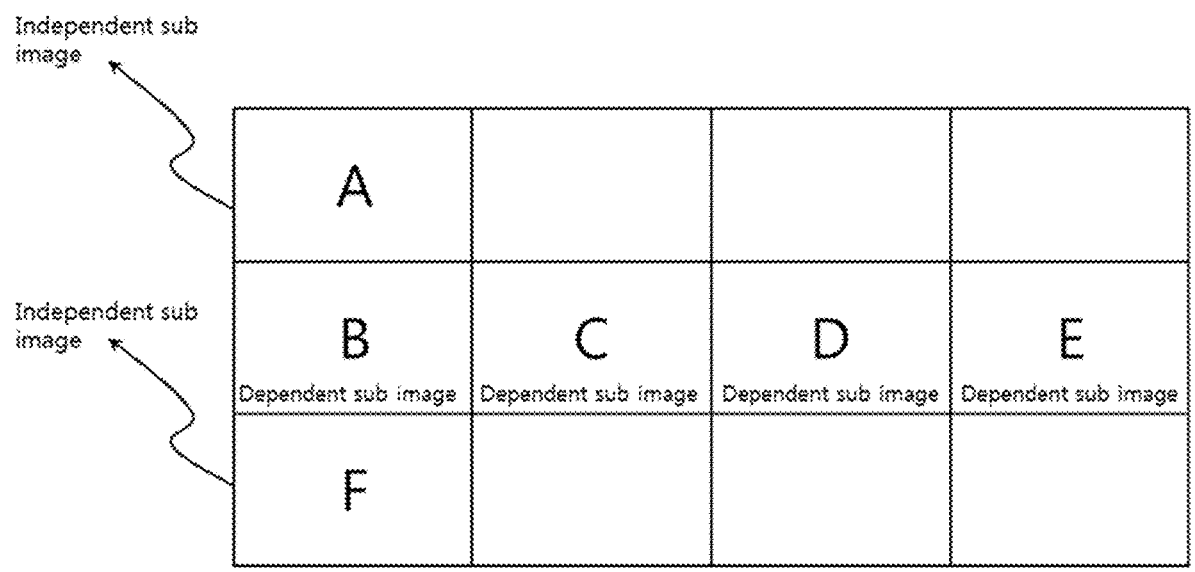

On the other hand, FIG. 23 is a diagram for explanation of sub image decoding method according to an embodiment of the present invention.

As described above, in method for decoding a portion of picture according to user perspective, as shown in FIG. 20, dependency of each sub images may be considered.

As described above, the encoding apparatus 100 and decoding apparatus 200 may give independency to a portion of pictures (sub images) according to encoding efficiency or scan order of sub images. And, independent sub image to which independency is given can remove dependency on other sub images by processing encoding and decoding with picture in screen.

On the other hand, the encoding apparatus 100 and decoding apparatus 200 may designate rest sub image as dependent sub image. Independent sub images having the same POC as dependent sub image may be added on reference picture list of dependent sub image, and the dependent sub images may be encoded or decoded through prediction in screen (intra coding) for neighboring independent sub images, may be processed with prediction between screen (inter coding) using independent sub image having the same POC as reference picture, or may be processed as encoding or decoding through prediction method between screens for independent sub images having different POC each other.

More specifically, independent sub images having different POC each other can be added in reference picture list corresponding to dependent sub images. The dependent sub image may be utilized as reference picture in prediction encoding in screen or in prediction encoding between screen referring independent sub images added in list.

Accordingly, decoding through prediction method in screen may be performed using independent sub image as reference picture for dependent sub images. And, decoding through prediction method between screens may be performed by designating the same POC as sub image for which decoding is currently performed as reference picture.

For example, since dependent sub image has high similarity at boundary region to independent sub images having the same POC, the encoding apparatus 100 may perform encoding using prediction method in screen with the independent sub image for the boundary region of dependent sub image.

At this time, independent sub images to be referred to may be changed according to unit of PPS or SPS or the like on HLS, and information thereabout may be signaled separately. And, the decoding apparatus 200 may derive dependent sub images based on independent sub images. And, decoding apparatus 200 may also receive whether being independency of all sub images as separate list form.

And, according to processing encoding and decoding based on SRAP and independency as described above, the decoding system 300 may select with ease a portion of bit stream according to user's perspective from entire bit stream to perform adaptive and selective decoding with efficiency.

And, independent sub image or dependent sub images may be performed signaling or indexing separately, and signal for identifying these may be delivered to the decoding apparatus 200. At this time, the decoding apparatus 200 may suppose a portion or the whole region of sub images to be decoding object according to user's perspective as direct encoding mode for neighboring region between sub images by referring neighboring independent sub image or sub images already decoded, and may perform restoration for the region.

Figure 24:
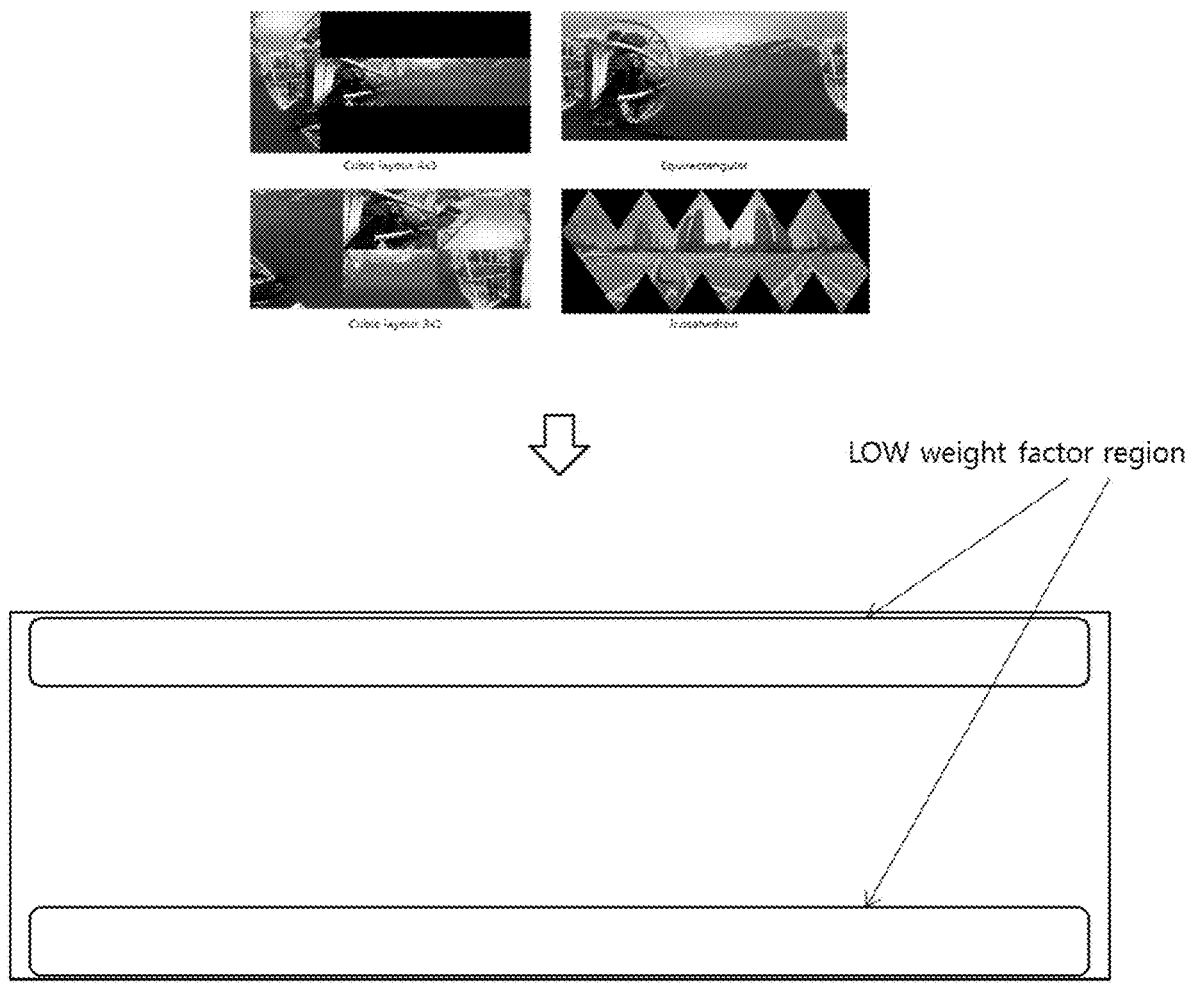

On the other hand, as shown in FIG. 24, in encoding with prediction in screen and prediction between screens as described above, coding method considering encoding efficiency may be illustrated.

Referring to FIG. 24, the encoding apparatus 100 according to an embodiment of the present invention may perform calculation (Metric) for applying weighting factor differently by region according to characteristics of video, for measuring distortion of PSNR of video or the like or measuring error value or the like of RDO process (encoding process).

As shown in FIG. 24, for user watching synchronized multi-view video using VR display, generally left-right visual field range by front perspective may be wide, while top-bottom visual field range narrow. Therefore, the encoding apparatus 100 may convert multi-view video into two-dimensional video, and enhance encoding efficiency by setting visual field upper end and lower end region as low weighting factor region.

FIG. 24 shows user perspective region of a variety of synchronized multi-view video, and shows region applied as low weighting factor region in case that multi-view video is Equirectangular type.

Especially, to apply weighting factor, the encoding apparatus 100 may perform firstly convert encoding synchronized multi-view video to two-dimensional video, and according to type of multi-view video, weighting factor region may be determined differently. And, weighting factor region information may be included in above-said spatial layout information or signaled separately through HLS. Also, weighting factor may be signaled on separate HLS, or transmitted in list form. Accordingly, the decoding apparatus 200 may perform decoding for weighting factor region based on weighting factor signaled.

The weighting factor region according to an embodiment of the present invention described above may be set by supposing that region on which human can concentrate is restricted in view of characteristics of natural video and characteristics of refracted 3D video or the like.

Accordingly, the encoding apparatus 100 may perform encoding for relatively low weighting factor region with applying relatively low QP as Base QP. And, the encoding apparatus 100 may measure PSNR for relatively low weighting factor region as low when measuring PSNR. On the contrary, the encoding apparatus 100 may perform operation of applying relatively high QP as Base QP, or measuring PSNR relatively high for region in which weighting factor is relatively high.

And, according to an embodiment of the present invention, for intra block duplication prediction as described above, decoding with reference to video having different perspective each other in the same POC may be performed, and at this time, as referred video, independent sub image which is capable of independent decoding may be illustrated.

Especially, the weighting factor may be used so that intra prediction for boundary region may be efficiently applied to maximize encoding efficiency for boundary region. For example, the encoding apparatus 100 may designate the weighting factor according to distance for patching region referred from independent sub image region, and apply scaling value for above, by which may determine prediction value of peripheral block efficiently.

And, the encoding apparatus 100 may apply weighting factor for boundary region in configuration of MPM (MOST PROBABLE MODE) for encoding in screen. Therefore, the encoding apparatus 100 may derive prediction direction of MPM with boundary face between sub images in video as center though not neighboring structurally.

On the other hand, the encoding apparatus 100 may also consider independent sub image in encoding between screens (inter coding). For example, the encoding apparatus 100 may refer to sub image positioned at related region (co-located) corresponding to independent sub image. Accordingly, at the time of configuration of reference picture for encoding between screens, only a portion of sub image from video may be added to reference picture list.

Figure 25:
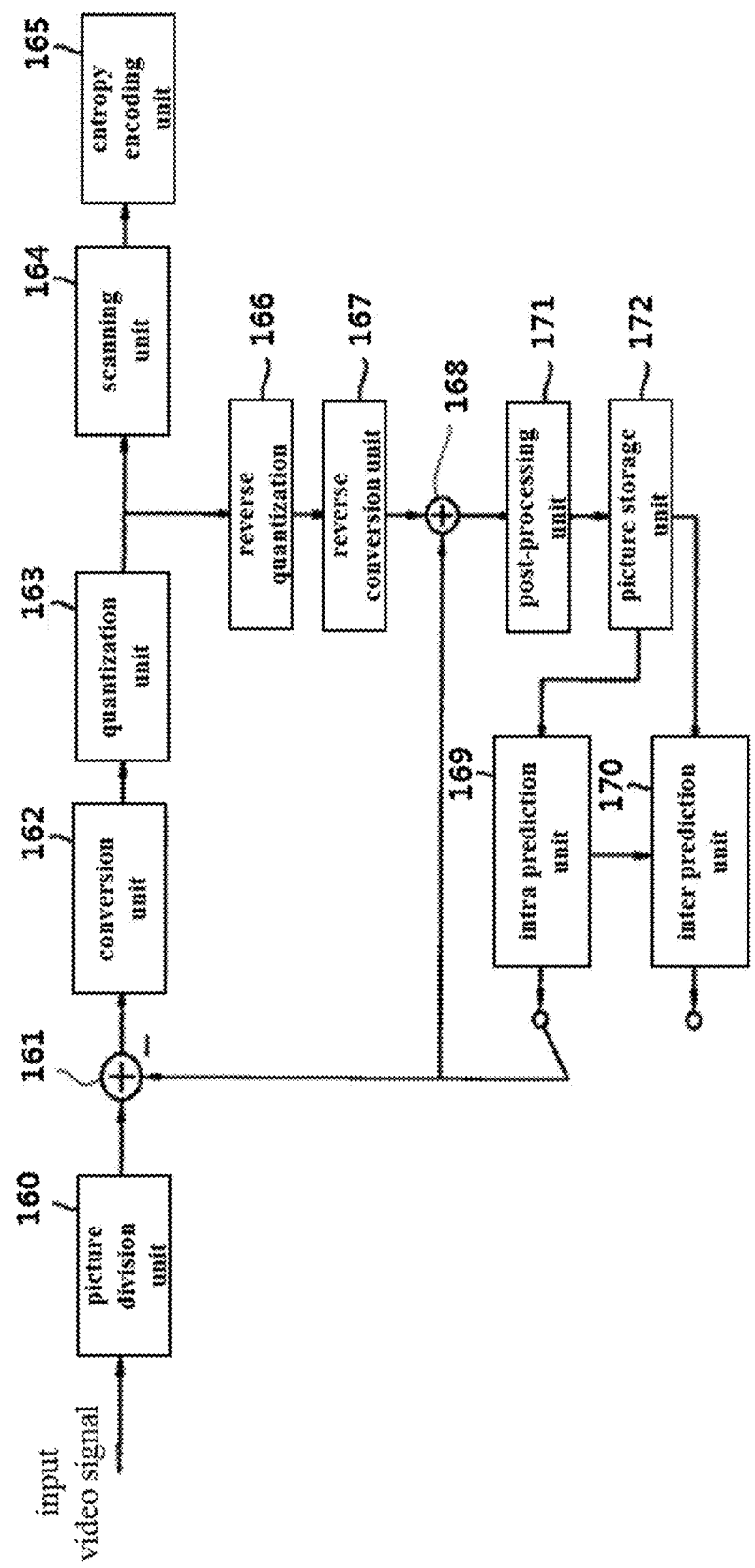
FIG. 25 and FIG. 26 are diagrams for explanation of encoding and decoding process according to an embodiment of the present invention.
Figure 26:
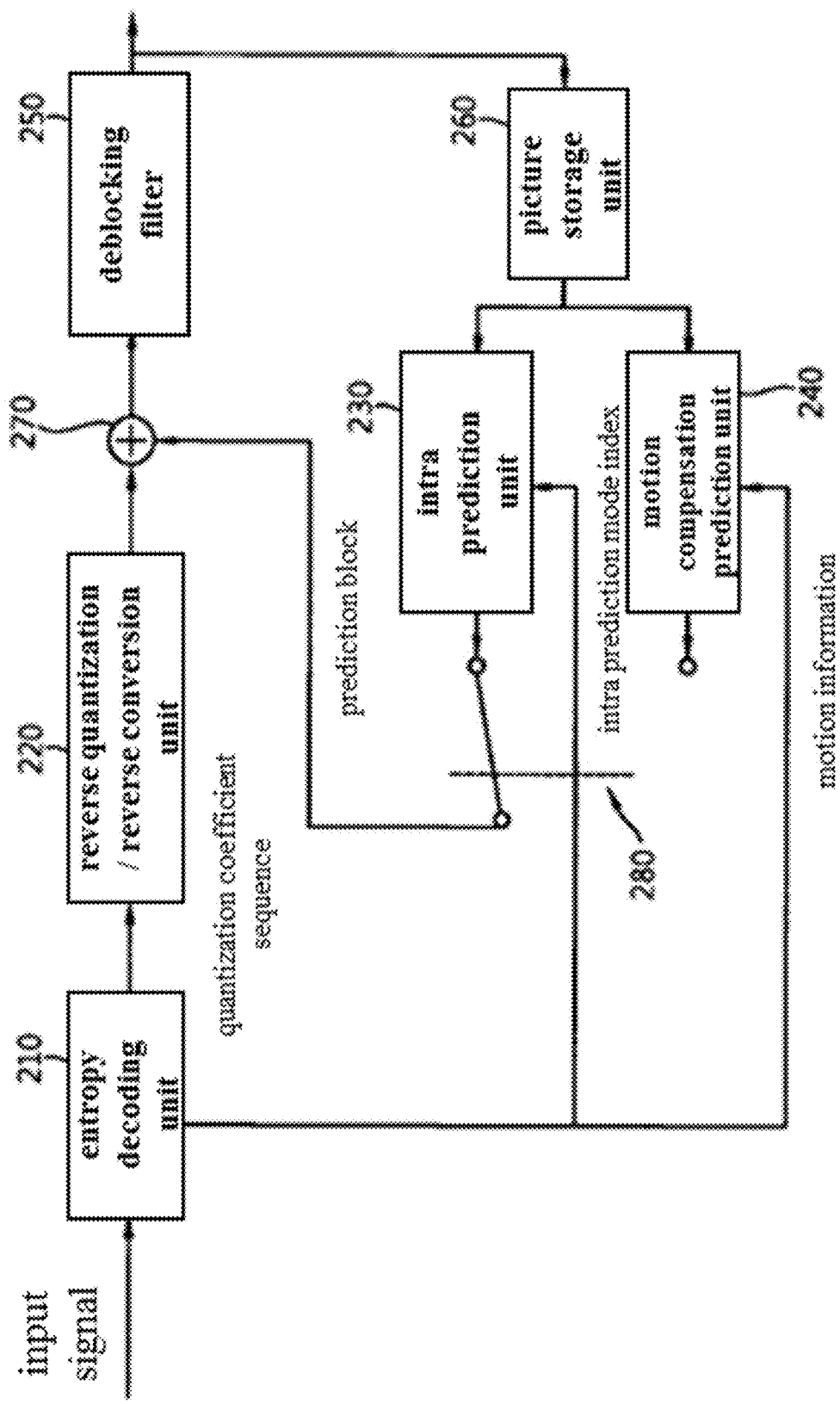

FIG. 25 and FIG. 26 are diagrams for explanation of encoding and decoding processing according to an embodiment of the present invention.

FIG. 25 shows configuration of video encoding apparatus according to an embodiment of the present invention as a block diagram, which may receive each sub image or entire frame of synchronized multi-view video according to an embodiment of the present invention as an input video signal to process.

Referring to FIG. 25, the video encoding apparatus 100 according to the present invention may include picture division unit 160, conversion unit, quantization unit, scanning unit, entropy encoding unit, intra prediction unit 169, inter prediction unit 170, reverse quantization unit, reverse conversion unit, post-processing unit 171, picture storage unit 172, subtraction unit and addition unit 168.

The picture division unit 160 may analyse video signal input to divide picture into coding unit of predetermined size by largest coding unit (LCU) and determine prediction mode and size of prediction unit by the coding unit.

And, the picture division unit 160 may send prediction unit to be encoded to the intra prediction unit 169 or inter prediction unit 170 according to prediction mode (or prediction method). And, the picture division unit 160 may send prediction unit to be encoded to subtraction unit.

The picture may be configured with a plurality of slices, and the slice may be configured with a plurality of largest encoding unit (Largest coding unit: LCU).

The LCU may be divided into a plurality of encoding unit (CU), encoder may add information (flag) showing whether being divided to bit stream. Decoder may recognize position of LCU using address (LcuAddr).

In case that division is not allowed, encoding unit (CU) is considered as prediction unit (PU), and decoder may recognize position of PU using PU index.

The prediction unit (PU) may be divided into a plurality of partitions. And prediction unit (PU) may be configured with a plurality of transformation unit (TU).

In this case, the picture division unit 160 may send video data to subtraction unit by block unit (for example, PU unit or TU unit) of predetermined size according to determined encoding mode.

CTB (Coding Tree Block) is used as video encoding unit, and at this time, CTB is defined as shape of a variety of square. CTB is called as coding unit (CU).

The coding unit (CU) may have form of quad tree according to division. And, in case of QTBT (Quad tree plus binary tree) division, coding unit may have form of the quad tree or binary tree binary divided from terminal node, and may be configured with maximum size of from 256×256 to 64×64 according to standard of encoder.

For example, the picture division unit 160 may have depth of 0 when largest coding unit (LCU) in case of maximum size of 64×64, and may perform encoding by searching optimal prediction unit recursively till depth become 3, or till coding unit (CU) of 8×8 size. And, for example, for coding unit of terminal node divided as QTBT, PU (Prediction Unit) and TU (transformation unit) may have the same form as or more divided form than coding unit divided above.

The prediction unit for performing prediction may be defined as PU (Prediction Unit), and for each coding unit (CU), prediction of unit divided as a plurality of blocks may be performed. Prediction is performed with being divided into forms of square and rectangle.

The conversion unit may convert residual block which is residual signal of original block of input prediction unit and prediction block generated from intra prediction unit 169 or inter prediction unit 170. The residual block may be configured with coding unit or prediction unit. The residual block configured with coding unit or prediction unit may be divided and converted to optimal transformation unit. Different conversion matrix may be determined according to prediction mode (intra or inter). And, since residual signal of intra prediction may have directionality according to intra prediction mode, conversion matrix may be determined adaptively according to intra prediction mode.

The transformation unit may be converted by two (horizontal, vertical) one-dimensional conversion matrix. For example, in case of inter prediction, predetermined one conversion matrix may be determined.

On the other hand, in case of intra prediction, since possibility that residual block may have directionality to vertical direction becomes higher in case tha intra prediction mode is horizontal, integer matrix based on DCT may be applied in vertical direction, while integer matrix based on DST or KLT may be applied in horizontal direction. In case that intra prediction mode is vertical, integer matrix based on DST or KLT may be applied in vertical direction, while integer matrix based on DCT, in horizontal direction.

In case of DC mode, integer matrix based on DCT may be applied in both directions. And, in case of intra prediction, depending on size of transformation unit, conversion matrix may be determined adaptively.

The quantization unit may determine quantization step size for quantization of coefficients of residual block converted by the conversion matrix. The quantization step size may be determined by encoding unit of greater than or equal to predetermined size (hereinafter, called as quantization unit).

The predetermined size may be 8×8 or 16×16. And, coefficients of the conversion block may be quantized using quantization matrix determined according to determined quantization step size and prediction mode.

The quantization unit may use quantization step size of quantization unit neighboring to current quantization unit as quantization step size predictor of current quantization unit.

The quantization unit may search in order of left quantization unit, upper quantization unit, and upper-left quantization unit of current quantization unit, and then use one or two effective quantization step size to generate quantization step size predictor of current quantization unit.

For example, effective first quantization step size searched in above order may be determined as quantization step size predictor. And, average value of effective two quantization step size searched in above order also may be determined as quantization step size predictor, and in case that only one is effective, that may be determined as quantization step size predictor.

When the quantization step size predictor is determined, disparity value between quantization step size of current encoding unit and the quantization step size predictor may be transmitted to entropy encoding unit.

On the other hand, there may be possibility that all of left coding unit, upper coding unit, and upper-left coding unit to current coding unit do not exist. On the contrary, coding unit may exist that exists prior on encoding order in largest coding unit.

Therefore, in quantization units neighboring to current coding unit and the largest coding unit, quantization step size of just prior quantization unit on encoding order may be candidate.

In this case, priority may be set in order of 1) left quantization unit to current coding unit, 2) upper quantization unit to current coding unit, 3) upper-left quantization unit to current coding unit, and 4) just prior quantization unit on encoding order. The order may be changed, and the upper-left quantization unit may be further omitted.

The quantized conversion block may be provided to reverse quantization unit and scanning unit.

The scanning unit may scan coefficients of quantized conversion block to convert to one-dimensional quantization coefficients. Since coefficient distribution of conversion block after quantization may be dependent on intra prediction mode, scanning way may be determined according to intra prediction mode.

And, coefficient scanning way may also be determined differently according to size of transformation unit. The scan pattern may become different according to directionality intra prediction mode. The scan order of quantization coefficients may be set as being scanned in reverse direction.

In case that the quantization coefficients are divided into a plurality of subsets, the same scan pattern may be applied to quantization coefficient in each subset. As scan pattern between subsets, zigzag scan or diagonal scan may be applied. As scan pattern, scanning from main subset including DC to rest subsets in forward direction is desirable, though reverse direction thereof is possible.

And, scan pattern between subsets may be set as the same as scan pattern of quantized coefficients in subset. In this case, scan pattern between subsets may be determined according to intra prediction mode. On the other hand, encoder may transmit information showing position of last non-zero quantization coefficient in the transformation unit to decoder.

Information showing position of last non-zero quantization coefficient in each subset may be also transmitted to decoder.

Reverse quantization 135 may reverse quantize the quantized quantization coefficient. The reverse conversion unit may restore reverse quantized convert coefficient to residual block of space region. Adder may generate restoration block by adding residual block restored by the reverse conversion unit and prediction block received from intra prediction unit 169 or inter prediction unit 170.

The post-processing unit 171 may perform deblocking filtering process for removal of blocking effect occurred in restored picture, adaptive offset application process for complement of difference value from original video by pixel unit, and adaptive loop filtering process for complement of difference value from original video by coding unit.

The deblocking filtering process is desirable to be applied to boundary of prediction unit and transformation unit having size greater than or equal to predetermined size. The size may be 8×8. The deblocking filtering process may include step for determining boundary for filtering, step for determining boundary filtering strength to be applied to the boundary, step for determining whether to apply deblocking filter or not, and step for selecting filter to be applied to the boundary in case that the deblocking filter is determined to be applied.

Whether the deblocking filter is applied or not is determined by i) whether the boundary filtering strength is greater than 0, and ii) whether value showing change degree of pixel values at boundary portion of two blocks (P block, Q block) neighboring to the boundary to be filtered is less than first reference value determined by quantization parameter.

It is desirable that the filter is two or more. In case that absolute value of difference value between two pixels positioned at block boundary is greater than or equal to second reference value, filter performing relatively weak filtering may be selected.

The second reference value is determined by the quantization parameter and the boundary filtering strength.

The adaptive offset application process is to reduce difference value (distortion) between pixel in video to which deblocking filter is applied and original pixel. Whether the adaptive offset application process is performed or not may be set by picture or slice unit.

The picture or slice may be divided into a plurality of offset regions, and offset type may be determined by each offset region. The offset type may include edge offset type of predetermined number (for example, four) and two band offset type.

In case that offset type is edge offset type, edge type in which each pixel falls in may be determined, and offset corresponding to the same may be applied. The edge type may be determined by distribution of two pixel values neighboring to current pixel.

The adaptive loop filtering process may perform filtering based on value comparing video restored through deblocking filtering process or adaptive offset application process and original video. The adaptive loop filtering may be applied to entire pixels included in block of 4×4 size or 8×8 size of the determined ALF.

Whether adaptive loop filter is applied or not may be determined by coding unit. The size and coefficient of applied loop filter may become different according to each coding unit. Information showing whether the adaptive loop filter is applied or not by coding unit may be included in each slice header.

In case of chrominance signal, whether adaptive loop filter is applied or not may be determined by picture unit. The form of loop filter may also have rectangle form differently from case of brightness.

Whether adaptive loop filtering is applied or not may be determined by slice. Therefore, information showing whether adaptive loop filtering is applied or not to current slice may be included in slice header or picture header.

When it is shown that adaptive loop filtering is applied to current slice, slice header or picture header may include additively information showing filter length of horizontal and/or vertical direction of brightness component used in adaptive loop filtering process.

The slice header or picture header may include information showing the number of filter set. At this time, when the number of filter set is two or more, filter coefficients may be encoded using prediction method. Therefore, slice header or picture header may include information showing whether filter coefficients are encoded by prediction method, in case that prediction method is used, may include predicted filter coefficient.

On the other hand, not only brightness, but also chrominance components may be filtered adaptively. Therefore, slice header or picture header may include information showing whether each chrominance component is filtered. In this case, to reduce the number of bits, information showing whether filtering on Cr and Cb may be performed with joint coding (that is, multiplexing coding).

At this time, in case of chrominance components, since possibility that the case in which Cr and Cb are both not filtered is the most frequent may be high to reduce complexity, entropy encoding may be performed with allocating the smallest index to the case in which Cr and Cb are both not filtered.

And, with allocating the largest index to the case in which Cr and Cb are both filtered, entropy encoding may be performed.

The picture storage unit 172 may receive post-processed video data input from post-processing unit 171, and restore video with picture unit to store. The picture may be video of frame unit or video of field unit. The picture storage unit 172 may be equipped with buffer (not shown) capable of storing a plurality of pictures.

The inter prediction unit 170 may perform motion presumption using at least one or more reference picture stored in the picture storage unit 172, and may determine reference picture index showing reference picture and motion vector.

And, according to determined reference picture index and motion vector, prediction block corresponding to prediction unit to be encoded may be extracted and output, from reference picture used in motion presumption from a plurality of reference pictures stored in picture storage unit 172.

The intra prediction unit 169 may perform intra prediction encoding using pixel value reconfigured in picture included in current prediction unit.

The intra prediction unit 169 may receive current prediction unit to be prediction encoded as input, and may select one from intra prediction modes of preset number according to size of current block to perform intra prediction.

The intra prediction unit 169 may perform filtering adaptively reference pixel to generate intra prediction block. In case that reference pixel is not available, reference pixels may be generated using available reference pixels.

The entropy encoding unit may perform entropy encoding of quantization coefficient quantized by quantization unit, intra prediction information received from the intra prediction unit 169, motion information received from the inter prediction unit 170, and the like.

Though not shown, the inter prediction encoding apparatus may be configured including motion information determination unit, motion information encoding mode determination unit, motion information encoding unit, prediction block generation unit, residual block generation unit, residual block encoding unit and multiplexer.

The motion information determination unit may determine motion information of current block. The motion information may include reference picture index and motion vector. The reference picture index may show any one of pictures restored with prior encoding.

In case that current block is single direction inter prediction encoded, any one of reference pictures belonged to list 0 (L0) may be shown. On the other hand, in case that current block is both directions prediction encoded, reference picture index showing one of reference pictures of list 0 (L0) and reference picture index showing one of reference pictures of list 1 (L1) may be included.

And, in case that current block is both directions prediction encoded, index showing one or two pictures of reference pictures of complex list (LC) generated by combining list 0 and list 1 may be included.

The motion vector may show position of prediction block in picture showing each reference picture index. The motion vector may be in pixel unit (integer unit), though may be also in sub pixel unit.

For example, it may have resolution of ½, ¼, ⅛ or ¹⁄₁₆ pixel. In case that motion vector is not in integer unit, prediction block may be generated from pixels of integer unit.

The motion information encoding mode determination unit may determine in which mode from skip mode, merge mode, and AMVP mode motion information of current block may be encoded.

The skip mode may be applied in case that there exist skip candidate having the same motion information as motion information of current block, and residual signal is 0. And, skip mode may be applied when current block is the same as coding unit in size. Current block may be considered as prediction unit.

The merge mode may be applied when there exist merge candidate having the same motion information as motion information of current block. The merge mode may be applied in case that current block is different from coding unit in size, or even though size is identical, in case that there exist residual signal. The merge candidate and skip candidate may be the same.

The AMVP mode may be applied when skip mode and merge mode is not applied. The AMVP candidate having the most similar motion vector to motion vector of current block may be selected as AMVP predictor.

The motion information encoding unit may encode motion information according to way determined by motion information encoding mode determination unit. In case that motion information encoding mode is skip mode or merge mode, merge motion vector encoding process may be performed. In case that motion information encoding mode is AMVP, AMVP encoding process may be performed.

The prediction block generation unit may generate prediction block using motion information of current block. In case that motion vector is integer unit, block corresponding to position shown by motion vector in picture shown by reference picture index, to generate prediction block of current block.

However, in case that motion vector is not integer unit, pixels of prediction block may be generated from integer unit pixels in picture shown by reference picture index.

In this case, in case of brightness pixel, prediction pixel may be generated using interpolation filter of eight taps. In case of chrominance pixel, prediction pixel may be generated using four tap interpolation filter.

The residual block generation unit may generate residual block using current block and prediction block of current block. In case that size of current block is 2N×2N, residual block may be generated using current block and prediction block of 2N×2N size corresponding to current block.

However, size of current block used in prediction is 2N×N or N×2N, prediction block for each of two 2N×N blocks configuring 2N×2N is acquired, and then final prediction block of 2N×2N size may be generated using above two 2N×N prediction blocks.

And, residual block of 2N×2N may be also generated using the prediction block of 2N×2N size. To settle discontinuity property of boundary portion of two prediction blocks of 2N×N size, overlap smoothing on pixels of boundary portion may be performed.

The residual block encoding unit may divide generated residual block into one or more transformation units. And, each transformation unit may be performed with convert encoding, quantization and entropy encoding. At this time, size of transformation unit may be determined in quad tree according to size of residual block.

The residual block encoding unit may convert residual block generated by inter prediction method using conversion matrix of integer base. The conversion matrix is DCT matrix of integer base.

The residual block encoding unit may use quantization matrix to quantize coefficients of residual block converted by the conversion matrix. The quantization matrix may be determined by quantization parameter.

The quantization parameter may be determined by coding unit of greater than or equal to predetermined size. The predetermined size may be 8×8 or 16×16. Therefore, in case that current coding unit is smaller than the predetermined size, quantization parameter of only first coding unit on encoding order on plurality of coding unit in the predetermined size may be encoded. The quantization parameter of rest coding unit is the same as the parameter, and needs not encoding.

And, coefficients of the conversion block may be quantized using quantization matrix determined according to determined quantization parameter and prediction mode.

The quantization parameter determined by coding unit of greater than or equal to the predetermined size may be prediction encoded using quantization parameter of coding unit neighboring to current coding unit. Left coding unit and upper coding unit of current coding unit are searched in order, and quantization parameter predictor of current coding unit may be generated using one or two effective quantization parameter.

For example, first effective quantization parameter searched in above order may be determined as quantization parameter predictor. And, first effective quantization parameter searched in order of left coding unit, just prior coding unit on encoding order may be determined as quantization parameter predictor.

The coefficients of quantized conversion block may be scanned and converted to one-dimensional quantization coefficients. The way of scanning may be set differently according to entropy encoding mode. For example, in case of encoding in CABAC, inter prediction encoded quantization coefficients may be scanned in predetermined way (zigzag, or raster scan in diagonal direction). On the other hand, in case of encoding in CAVLC, it may be scanned in other way than above.

For example, in case that scanning way is inter, it is determined as zigzag, while in case of intra, it may be determined according to intra prediction mode. And, coefficient scanning way may be determined differently according to size of transformation unit.

The scan pattern may become different according to directionality intra prediction mode. The scan order of quantization coefficients may set as being scanned in reverse direction.

The multiplexer may multiplex motion informations encoded by the motion information encoding unit and residual signals encoded by the residual block encoding unit. The motion information may become different according to encoding mode.

That is, in case of skip or merge, only index showing prediction may be included. However, in case of AMVP, reference picture index, disparity motion vector and AMVP index of current block may be included.

Hereinafter, an embodiment for operation of intra prediction unit 169 will be described in detail.

First, prediction mode information and size of prediction block may be received by the picture division unit 160, and prediction mode information may show intra mode. The size of prediction block may be square of 64×64, 32×32, 16×16, 8×8, 4×4 and the like, but not limited as above. That is, size of the prediction block may be non-square which is not square.

Nest, to determine intra prediction mode of prediction block, reference pixel may be read in from the picture storage unit 172.

Whether to generate reference pixel or not may be determined by reviewing whether unavailable reference pixel exist or not. The reference pixels may be used in determining intra prediction mode of current block.

In case that current block is positioned at upper boundary of current picture, pixels neighboring to upper of current block may not be defined. And, in case that current block is positioned at left boundary of current picture, pixels neighboring left of current block may not be defined.

These pixels are determined to be unavailable pixels. And, in case that current block is positioned at slice boundary, and pixels neighboring to upper or left of slice are not pixels being encoded and restored in priority, they are determined to be unavailable pixels.

As described above, in case that there do not exist pixels neighboring to left or upper of current block, or there do not exist pixels being encoded and restored in priority, intra prediction mode of current block may be determined using only available pixels. However, reference pixels of unavailable position may be also generated using available reference pixels of current block. For example, in case that pixels of upper block is unavailable, upper pixels may be generated using a portion or the whole of left pixels, and vice versa.

That is, reference pixel may be generated by duplicating available reference pixel of nearest position in predetermined direction from reference pixel of unavailable position. In case that available reference pixel does not exist in predetermined direction, reference pixel may be generated by duplicating available reference pixel of nearest position in opposite direction.

On the other hand, even in case that upper or left pixels of current block exist, it may be determined as unavailable reference pixel according to encoding mode of block in which the pixel belongs to.

For example, block to which reference pixel neighboring to upper of current block is inter encoded and restored block, the pixels may be determined as unavailable pixels.

In this case, available reference pixels may be generated using pixels belonging to block in which block neighboring to current block is intra encoded and restored. In this case, information that available reference pixel is determined according to encoding mode may be transmitted from encoder to decoder.

Nest, intra prediction mode of current block may be determined using the reference pixels. The number of intra prediction mode allowable to current block may become different according to size of block. For example, in case that size of current block is 8×8, 16×16, and 32×32, 34 intra prediction modes may exist, and in case that size of current block is 4×4, 17 intra prediction modes may exist.

Above 34 or 17 intra prediction modes may be configured with at least one or more non-directional modes and a plurality of directional modes.

One or more non-directional modes may be DC mode and/or planar mode. In case that DC mode and planar mode are included in non-directional mode, regardless of size of current block, 35 intra prediction modes may also exist.

At this time, two non-directional modes (DC mode and planar mode) and 33 directional modes may be included.

The planar mode may generate prediction block of current block using at least one pixel value positioned at bottom-right of current block (or prediction value of the pixel value, hereinafter called as first reference value) and reference pixels.

As described above, configuration of video decoding apparatus according to an embodiment of the present invention may be deduced from configuration of video encoding apparatus described with reference to FIG. 1, FIG. 2 and FIG. 25, and video may be decoded, for example, by performing reverse processing of encoding process as described with reference to FIG. 2 and FIG. 25.

FIG. 26 shows a block diagram of configuration of video decoding apparatus according to an embodiment of the present invention.

Referring to FIG. 26, video decoding apparatus according to the present invention is equipped with entropy decoding unit 210, reverse quantization/reverse conversion unit 220, adder 270, deblocking filter 250, picture storage unit 260, intra prediction unit 230, motion compensation prediction unit 240 and intra/inter changing switch 280.

The entropy decoding unit 210 may decode encoded bit stream transmitted from video encoding apparatus, and may separate it into intra prediction mode index, motion information, quantization coefficient sequence and the like. The entropy decoding unit 210 may provide decoded motion information to motion compensation prediction unit 240.

The entropy decoding unit 210 may provide the intra prediction mode index to the intra prediction unit 230, and reverse quantization/reverse conversion unit 220. And, the entropy decoding unit 210 may provide the reverse quantization coefficient sequence to reverse quantization/reverse conversion unit 220.

The reverse quantization/reverse conversion unit 220 may convert the quantization coefficient sequence to reverse quantization coefficient of two-dimensional arrangement. For above conversion, one of a plurality of scanning patterns may be selected. One from a plurality of scanning patterns may be selected based on at least one of prediction mode of current block (that is, any one of intra prediction and inter prediction) and intra prediction mode.

The intra prediction mode may be received from intra prediction unit or entropy decoding unit.

The reverse quantization/reverse conversion unit 220 may restore quantization coefficient using quantization matrix selected from a plurality of quantization matrix at reverse quantization coefficient of the two-dimensional arrangement. Different quantization matrix may be applied according to size of current block to be restored, and even for block of the same size, quantization matrix may be selected based on at least one of prediction mode and intra prediction mode of the current block.

And, residual block may be restored by reverse conversion of restored quantization coefficient.

The adder 270 may restore video block by adding residual block restored by reverse quantization/reverse conversion unit 220 and prediction block generated by intra prediction unit 230 or motion compensation prediction unit 240.

The deblocking filter 250 may perform deblocking filter processing to restored video generated by adder 270. Accordingly, deblocking artefact caused by video loss according to quantization process may be reduced.

The picture storage unit 260 may be frame memory maintaining local decoded video performed with deblocking filter processing by deblocking filter 250.

The intra prediction unit 230 may restore intra prediction mode of current block based on intra prediction mode index received from entropy decoding unit 210. And, prediction block may be generated according to restored intra prediction mode.

The motion compensation prediction unit 240 may generate prediction block for current block from picture stored in picture storage unit 260 based on motion vector information. In case that motion compensation of decimal point precision is applied, prediction block may be generated by applying selected interpolation filter.

The intra/inter changing switch 280 may provide prediction block generated from any one of intra prediction unit 230 and motion compensation prediction unit 240 based on encoding mode to adder 270.

Current block may be restored using prediction block of current block restored in such a way and residual block of decoded current block.

The video bit stream according to an embodiment of the present invention may be unit used in storing encoded data at one picture, and may include PS (parameter sets) and slice data.

The PS (parameter sets) may be divided into picture parameter set (hereinafter, simply referred as PPS) which is data corresponding to head of each picture, and sequence parameter set (hereinafter, simply referred as SPS). The PPS and SPS may include initializing information necessary for initializing each encoding, and spatial layout information according to an embodiment of the present invention may be included.

The SPS is common reference information for decoding all pictures encoded with random access unit (RAU), and may include profile, maximum number of available picture for reference, picture size, and the like.

The PPS is reference information for decoding picture for each picture encoded with random access unit (RAU), and may include kind of variable length encoding method, initial value of quantization step, and a plurality of reference pictures.

On the other hand, slice header (SH) may include information for the slice at the time of coding of slice unit.

The method according to the present invention described above may be produced as program for implementation at computer and may be stored in recording medium readable by computer, wherein example of recording medium readable by computer may include ROM, RAM, CD-ROM, magnetic tape, floppy disk, light data storage apparatus, and the like.

The recording medium readable by computer may be distributed on computer system connected by network, and code readable by computer may be stored and implemented in distributed way. And, functional program, code and code segments for realizing the method may be inferred by programmers of technical field in which the present invention belongs to with ease. And, some desirable embodiments of the present invention were depicted and described above, the present invention is not limited to such specific embodiments, but a variety of changed implementation may be of course possible by a person with ordinary knowledge in the technical field in which the present invention belongs to without escaping from the gist of the present invention stated in claims, and these modified implementation should be understood as not to be separate from technical idea or perspective of the present invention.

What is claimed is:

1. A video encoding method comprising:
   acquiring a synchronized omnidirectional multi-view video;
   generating spatial layout information of the synchronized omnidirectional multi-view video;
   encoding the synchronized omnidirectional multi-view video; and
   signaling the spatial layout information corresponding to the encoded multi-view video,
   wherein the spatial layout information comprises:
      projection type information corresponding to a layout of the synchronized omnidirectional multi-view video; and
      perspective information corresponding to the projection type information, and wherein the perspective information is signaled with the projection type information.

2. The video encoding method of claim 1, wherein the synchronized omnidirectional multi-view video is a video having a plurality of multi-view sub images arranged on a time-based synchronized video frame according to a spatial layout.

3. The video encoding method of claim 1, wherein the spatial layout information is signaled through a parameter set for encoding the synchronized omnidirectional multi-view video.

4. The video encoding method of claim 3, further comprising
   signaling a flag showing whether the synchronized omnidirectional multi-view video or not through the parameter set.

5. The video encoding method of claim 1, wherein the spatial layout information further comprises at least one of type index, camera parameter, scene angle, scene dynamic range, independent sub image, and scene time information.

6. The video encoding method of claim 1, wherein the spatial layout information further comprises scanning order information of the synchronized omnidirectional multi-view video.

7. The video encoding method of claim 1, wherein the spatial layout information further comprises independency information corresponding to a plurality of sub images of the synchronized omnidirectional multi-view video, and
   wherein each of the plurality of sub images are identified as an independent sub image encoded or decoded without reference to another sub image and a dependent sub image encoded or decoded with reference to another sub image.

8. The video encoding method of claim 7, wherein a boundary region near each of the plurality of sub images is encoded with reference to the independent sub image, and
   wherein a boundary region of a decoded independent sub image or a decoded dependent sub image is referred in decoding of rest a remainder of the plurality of sub images.

9. A video decoding method comprising;
   receiving a bit stream including an encoded video;
   acquiring spatial layout information corresponding to a synchronized omnidirectional multi-view video; and
   selectively decoding at least a portion of the bit, stream based on the spatial layout information,
   wherein the spatial layout information comprises:
      projection type information corresponding to a layout of the synchronized omnidirectional multi-view video; and
      perspective information corresponding to the projection type information, and wherein the perspective information is signaled with the projection type information.

10. The video decoding method according to claim 9, wherein the step of selectively decoding comprises selecting the portion of the bit stream corresponding to an interested region determined according to a change in user perspective.

11. The video decoding method of claim 9, wherein the synchronized omnidirectional multi-view video is a video having a plurality of sub images arranged on a time-based synchronized video frame according to a spatial layout,
   wherein each of the plurality of sub images are identified as an independent sub image encoded or decoded without reference to another sub image or a dependent sub image encoded or decoded with reference to another sub image.

12. The video decoding method of claim 11, wherein the selectively decoding comprises using a picture designated as SRAP (SPATIAL RANDOM ACCESS PICTURE) as a reference picture for decoding the plurality of multi-view sub images.

13. The video decoding method of claim 11, wherein the selectively decoding comprises decoding a picture designated as an independent sub image as a reference picture for the dependent sub images.

14. The video decoding method of claim 11, wherein the selectively decoding comprises adding the independent sub images having the same POC (Picture Order Count) as the dependent sub images to be decoded into a reference picture list.

15. The video decoding method of claim 11, wherein the selectively decoding comprises performing decoding using a prediction method in screen with an independent sub image on a boundary region of a dependent sub image.

16. The video decoding method of claim 11, wherein the selectively decoding comprises applying a weighting factor of decoding calculation according to a synchronized multi-view video type.

17. The video decoding method of claim 16, wherein the applying the weighting factor comprises setting a base QP (Quality Parameter) value on a boundary region of a sub image higher than that of an other region.

* * * * *